United States Patent
Kimura

(10) Patent No.: US 10,908,899 B2
(45) Date of Patent: Feb. 2, 2021

(54) CODE CONVERSION APPARATUS AND METHOD FOR IMPROVING PERFORMANCE IN COMPUTER OPERATIONS

(71) Applicant: FUJITSU LIMITED, Kawasaki (JP)

(72) Inventor: Shigeru Kimura, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/376,557

(22) Filed: Apr. 5, 2019

(65) Prior Publication Data
US 2019/0317767 A1    Oct. 17, 2019

(30) Foreign Application Priority Data

Apr. 12, 2018 (JP) ................................. 2018-077108

(51) Int. Cl.
*G06F 9/44* (2018.01)
*G06F 9/30* (2018.01)
(Continued)

(52) U.S. Cl.
CPC ...... *G06F 9/30025* (2013.01); *G06F 9/30101* (2013.01); *G06F 9/30036* (2013.01);
(Continued)

(58) Field of Classification Search
CPC .......... G06F 8/452; G06F 8/4441; G06F 8/10; G06F 8/20; G06F 8/443; G06F 8/52;
(Continued)

(56) References Cited

U.S. PATENT DOCUMENTS

| | | | | |
|---|---|---|---|---|
| 5,590,345 A | * | 12/1996 | Barker | G06F 7/483 |
| | | | | 712/11 |
| 5,625,836 A | * | 4/1997 | Barker | G06F 7/483 |
| | | | | 709/214 |

(Continued)

FOREIGN PATENT DOCUMENTS

JP    2013-206291    10/2013

OTHER PUBLICATIONS

Robert Strzodka, Abstraction for AoS and SoA Layout in C++, 2012, [Retrieved on Sep. 28, 2020]. Retrieved from the internet: <URL: https://pdf.sciencedirectassets.com/280711/3-s2.0-C20100686548/3-s2.0-B9780123859631000319/main.pdf> 13 Pages (429-441) (Year: 2012).*

(Continued)

*Primary Examiner* — Anibal Rivera
(74) *Attorney, Agent, or Firm* — Fujitsu Patent Center

(57) ABSTRACT

A code conversion apparatus includes a memory and a processor coupled to the memory. The memory is configured to store therein a first code including a first data definition of a plurality of arrays, a first operation for the plurality of arrays, and a second data definition of an array indicating a result of the first operation. The processor is configured to convert the first data definition and the second data definition included in the first code into a data definition of an array of structures. The processor is configured to convert the first operation included in the first code into a second operation for the array of structures. The processor is configured to generate a second code including a predetermined instruction to perform the second operation on different pieces of data of the plurality of arrays in parallel with one another.

12 Claims, 22 Drawing Sheets

(51) Int. Cl.
  *G06F 9/48* (2006.01)
  *G06F 9/455* (2018.01)
  *G06F 9/38* (2018.01)
(52) U.S. Cl.
  CPC ...... *G06F 9/30076* (2013.01); *G06F 9/30109* (2013.01); *G06F 9/3887* (2013.01); *G06F 9/45504* (2013.01); *G06F 9/4881* (2013.01)
(58) Field of Classification Search
  CPC .. G06F 9/45504; G06F 9/4881; G06F 9/3851; G06F 9/30076; G06F 9/30036; G06F 9/30025; G06F 9/30101; G06F 9/3887; G06F 9/30109; G06F 9/30032; G06F 9/445; G06F 15/7867; G06F 12/02; G06F 8/444; G06F 8/43; G06F 7/483
  See application file for complete search history.

(56) References Cited

U.S. PATENT DOCUMENTS

| | | | | |
|---|---|---|---|---|
| 5,708,836 A * | 1/1998 | Wilkinson | G06F 7/483 | 712/11 |
| 5,717,944 A * | 2/1998 | Wilkinson | G06F 9/3834 | 712/20 |
| 5,734,921 A * | 3/1998 | Dapp | G06F 9/30036 | 709/238 |
| 5,799,183 A * | 8/1998 | Iwashita | G06F 12/08 | |
| 5,966,528 A * | 10/1999 | Wilkinson | G06F 9/30076 | 712/10 |
| 6,113,650 A * | 9/2000 | Sakai | G06F 8/452 | 711/201 |
| 6,463,582 B1 * | 10/2002 | Lethin | G06F 9/45504 | 717/138 |
| 8,327,344 B2 * | 12/2012 | Gschwind | G06F 8/4441 | 717/149 |
| 9,256,437 B2 * | 2/2016 | Arakawa | G06F 9/3851 | |
| 9,430,203 B2 * | 8/2016 | Ishii | G06F 8/452 | |
| 10,073,700 B2 * | 9/2018 | Furtek | G06F 15/17362 | |
| 2006/0248317 A1 * | 11/2006 | Vorbach | G06F 15/7867 | 712/221 |
| 2007/0294512 A1 * | 12/2007 | Crutchfield | G06F 8/443 | 712/200 |
| 2008/0263530 A1 * | 10/2008 | Rahavan | G06F 8/52 | 717/159 |
| 2009/0002379 A1 * | 1/2009 | Baeza | H04N 19/436 | 345/522 |
| 2009/0003446 A1 * | 1/2009 | Wu | H04N 19/587 | 375/240.16 |
| 2009/0003447 A1 * | 1/2009 | Christoffersen | H04N 19/192 | 375/240.16 |
| 2010/0095285 A1 * | 4/2010 | Gschwind | G06F 8/4441 | 717/154 |
| 2013/0262824 A1 * | 10/2013 | Arakawa | G06F 9/3887 | 712/205 |
| 2013/0339649 A1 * | 12/2013 | Hsu | G06F 9/30036 | 711/170 |
| 2015/0178056 A1 * | 6/2015 | Amiri | G06F 8/443 | 717/151 |
| 2015/0243259 A1 * | 8/2015 | Hsu | G09G 5/363 | 345/537 |
| 2015/0294435 A1 * | 10/2015 | Pal | G06F 9/445 | 345/544 |
| 2016/0313980 A1 * | 10/2016 | Meixner | G06F 9/30101 | |
| 2016/0313984 A1 * | 10/2016 | Meixner | G06F 9/30032 | |
| 2016/0357529 A1 * | 12/2016 | Tsujimori | G06F 8/452 | |
| 2017/0177344 A1 * | 6/2017 | Ould-Ahmed-Vall | G06F 9/30101 | |
| 2017/0177345 A1 * | 6/2017 | Ould-Ahmed-Vall | G06F 9/30032 | |
| 2017/0177355 A1 * | 6/2017 | Ould-Ahmed-Vall | G06F 9/30036 | |
| 2017/0177356 A1 * | 6/2017 | Ould-Ahmed-Vall | G06F 9/30109 | |
| 2018/0005347 A1 * | 1/2018 | Meixner | G06T 1/20 | |
| 2018/0007302 A1 * | 1/2018 | Meixner | G06F 12/0207 | |
| 2018/0081685 A1 * | 3/2018 | Bhuiyan | G06F 13/4068 | |
| 2019/0004220 A1 * | 1/2019 | Hsieh | G03H 1/26 | |
| 2019/0018664 A1 * | 1/2019 | Mani | G06F 8/43 | |
| 2019/0042220 A1 * | 2/2019 | Guggilla | G06F 8/4434 | |

OTHER PUBLICATIONS

N Z Jhanjhi et al., Middleware Power Saving Scheme for Mobile Applications, 2018, [Retrieved on Sep. 28, 2020]. Retrieved from the internet: <URL: https://ieeexplore.ieee.org/stamp/stamp.jsp?tp=&arnumber=8776711> 6 Pages (1-6) (Year: 2018).*

* cited by examiner

FIG. 1A    real *8 A(n),B(n),C(n)

FIG. 1C
```
subroutine prog(A,B,C)
real *8 A(1024),B(1024),C(1024)
integer i
do i=1,1024
   C(i) = A(i)+B(i)
enddo
```

```
subroutine prog(A,B,C)
real *8 A(1024),B(1024),C(1024)
integer i
do i=1,1024,4
   C(i:i+3) = A(i:i+3)+B(i:i+3)
enddo
```

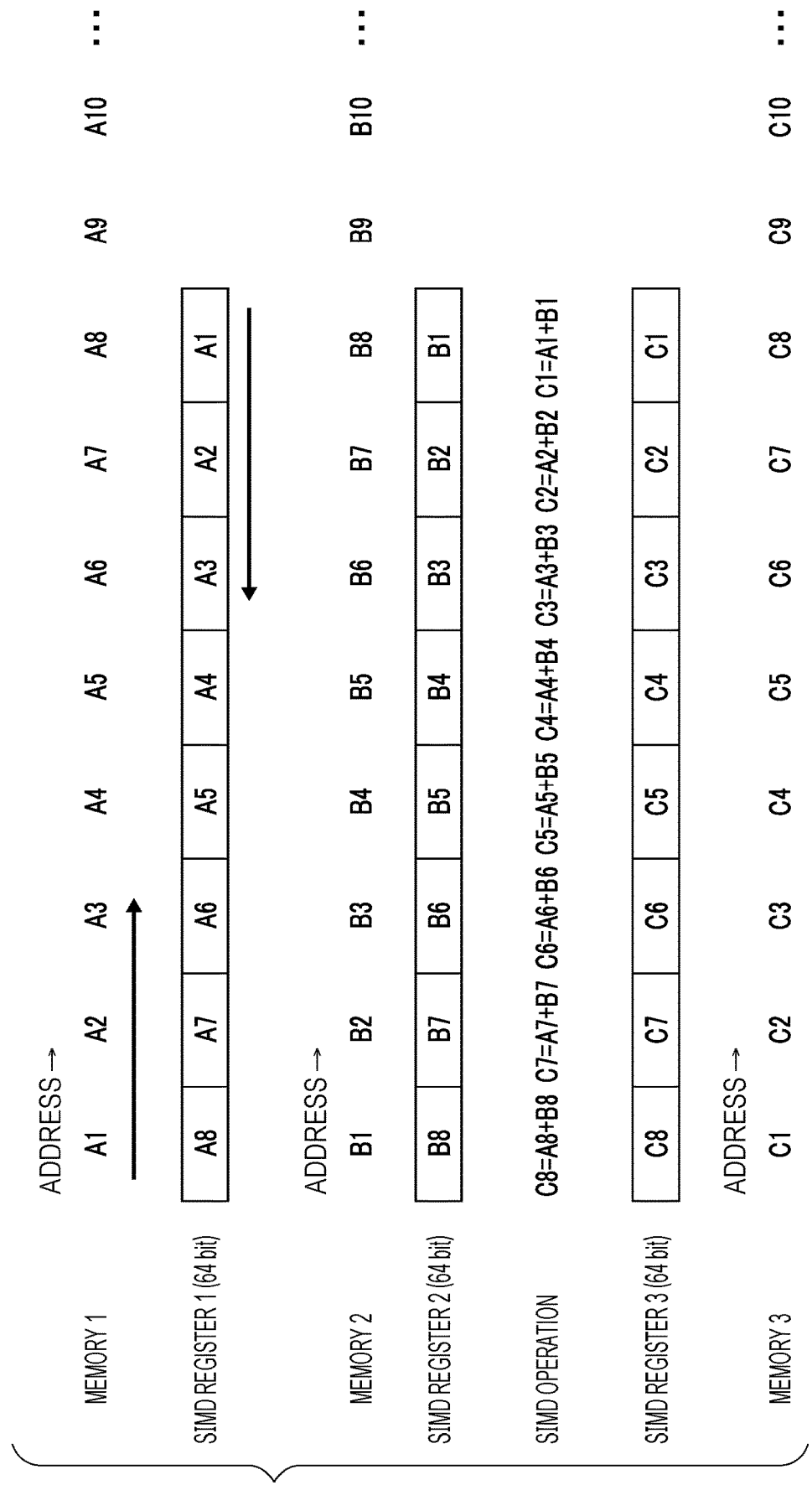

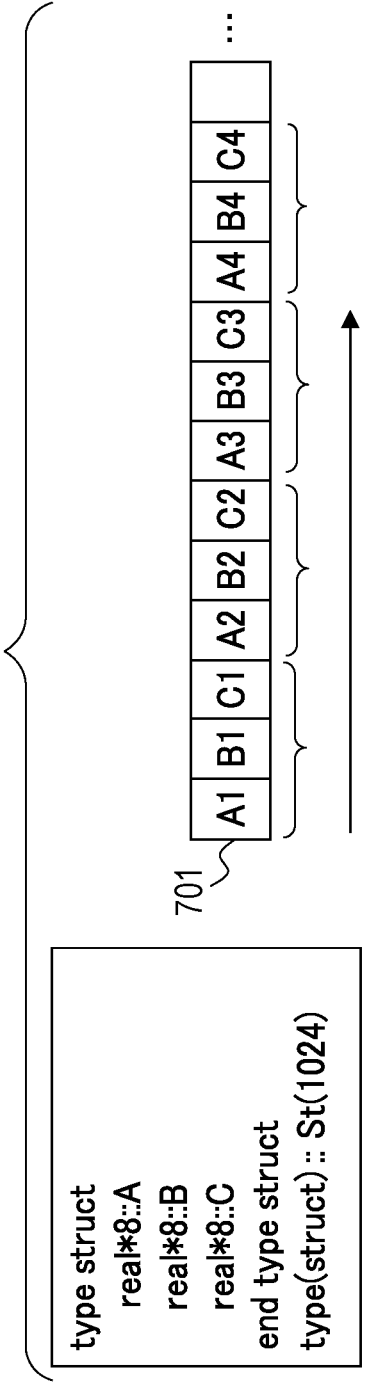
FIG. 7A
FIG. 7B
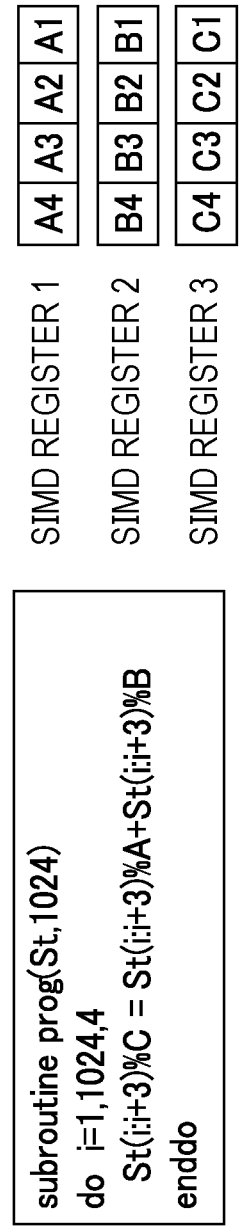
FIG. 7C

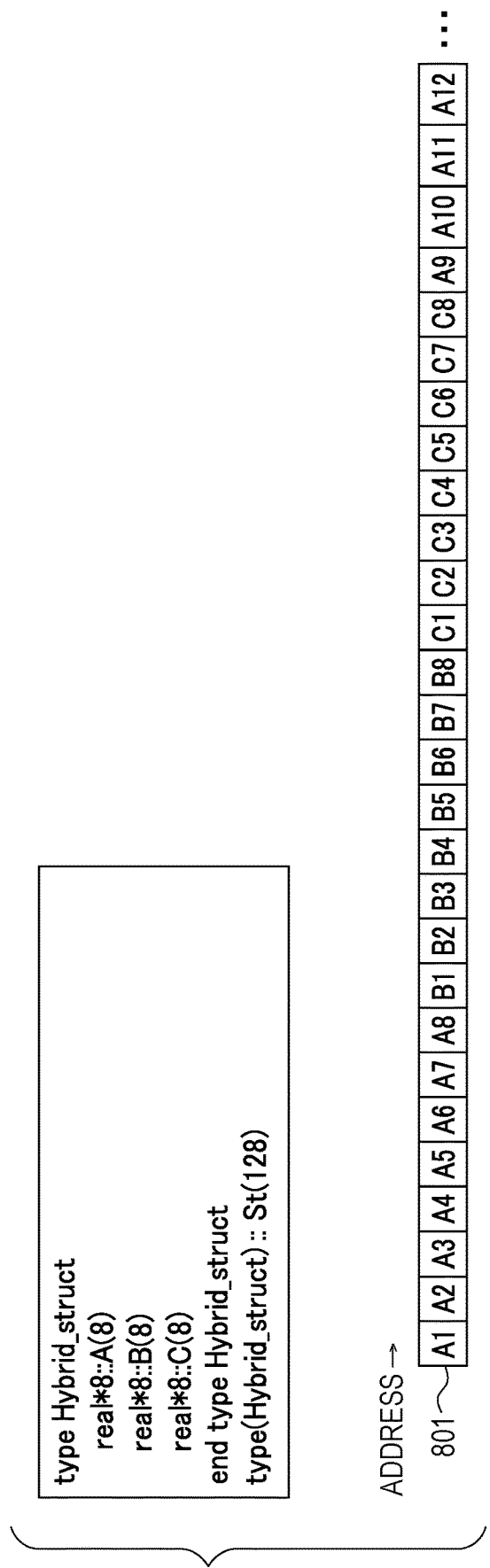

FIG. 9

| PROGRAM CHARACTERISTICS | | DATA DEFINITION | |
|---|---|---|---|
| | | SOA | AOS |
| ACCESS LOCALITY | NO | ✓ | ✗ |
| | YES | ✗ | ✓ |
| HARDWARE RESOURCE LOADS | HPF | ✗ (LARGE) | ✓ (NONE) |
| | TLB ERRORS | ✗ (LARGE) | ✓ (SMALL) |
| PROCESSOR SIMD SUPPORT CONDITION | HORIZONTAL | ✓ | △ |
| | VERTICAL | ✗ | ✓ |

```
Real*8 , DIMENSION(10:20) ::A
```

```
INTEGER, DIMENSION(10:20) ::B,C
```

```
!ocl AOS(A,B,C)
DO  i=1,n
        ··· A(i,j)
        ··· B(i,j)
        ··· C(i,j)
End do
```

```
type struct
    real*8::A
    INTEGER::B,C
end type struct
type(struct) :: St(10:20)
```

```
DO  i=1,n
        ··· St(i,j)%A
        ··· St(i,j)%B
        ··· St(i,j)%C
End do
```

FIG. 13A

```
DO i=1,n
  j=A(i)+B(i)
  S=AA(i,j) * c + BB(i,j) + AA(i+1,j) / AA(x,z) + BB(i+2,j) + BB(z,c) + CC(x,y)*A(i+2)
  K=AA(i,j) * DD(x,y) + α(W(i)) + β(W(i)) ···
  ...
End do
```

FIG. 13B

| VARIABLE | ARRAY NAME | No. OF DIMENSIONS | No. OF APPEARANCES | FIRST DIMENSION | SECOND DIMENSION | THIRD DIMENSION | P-TH DIMENSION | GROUP No. |
|---|---|---|---|---|---|---|---|---|
| A(i) | A | 1 | 1 | i | – | – | ⋯ | 1 |
| A(i+2) | A | 1 | 1 | i+2 | – | – | ⋯ | |
| B(i) | B | 1 | 1 | i | – | – | ⋯ | 1 |
| AA(i,j) | AA | 2 | 2 | i | j | – | ⋯ | 2 |
| AA(i+1,j) | AA | 2 | 1 | i+1 | j | – | ⋯ | |
| AA(x,z) | AA | 2 | 1 | x | z | – | ⋯ | |
| BB(i,j) | BB | 2 | 1 | i | j | – | ⋯ | 2 |
| BB(i+2,j) | BB | 2 | 1 | i+2 | j | – | ⋯ | |
| BB(z,c) | BB | 2 | 1 | z | c | – | ⋯ | |
| CC(x,y) | CC | 2 | 1 | x | y | – | ⋯ | 3 |
| DD(x,y) | DD | 2 | 1 | x | y | – | ⋯ | 3 |
| ⋯ | ⋯ | ⋯ | | ⋯ | ⋯ | | ⋯ | |
| α(W(i)) | α | 1 | 1 | W(i) | – | – | ⋯ | 4 |
| β(W(i)) | β | 1 | 1 | W(i) | – | – | ⋯ | 4 |
| ⋯ | ⋯ | ⋯ | | ⋯ | ⋯ | | ⋯ | |

FIG. 14

| GROUP No. | Q | C(Q) | w1 | M(Q) | G(Q) | w2 | EVALUATION VALUES | TOTAL |
|---|---|---|---|---|---|---|---|---|
| 1 | A | 2 | 1 | 1 | 2 | 2 | 1.14(2/14*1+1/2*2) | 2.21 |
| 1 | B | 1 | 1 | 1 | 2 | 2 | 1.07(1/14*1+1/2*2) | 2.21 |
| 2 | AA | 4 | 1 | 1 | 2 | 2 | 1.29(4/14*1+1/2*2) | 2.5 |
| 2 | BB | 3 | 1 | 1 | 2 | 2 | 1.21(3/14*1+1/2*2) | 2.5 |
| 3 | CC | 1 | 1 | 1 | 2 | 2 | 1.07(1/14*1+1/2*2) | 2.14 |
| 3 | DD | 1 | 1 | 1 | 2 | 2 | 1.07(1/14*1+1/2*2) | 2.14 |
| 4 | α | 1 | 1 | 1 | 2 | 2 | 1.07(1/14*1+1/2*2) | 2.14 |
| 4 | β | 1 | 1 | 1 | 2 | 2 | 1.07(1/14*1+1/2*2) | 2.14 |

FIG. 16

```
Real*8, DIMENSION(1024,1024) ::A,B,C
```

```
DO  j=1,1024
  DO  i=1,1024
    C(i,j) =  A(i,j) + B(i,j)
    ...
  End do
End do
```

⇩

```
type struct
    real*8::A
    real*8::B
    real*8::C
end type struct
type(struct) :: St(1024,1024)
```

```
DO  j=1,1024
  DO  i=1,1024
    St(i,j)%C =  St(i,j)%A + St(i,j)%B
    ...
  End do
End do
```

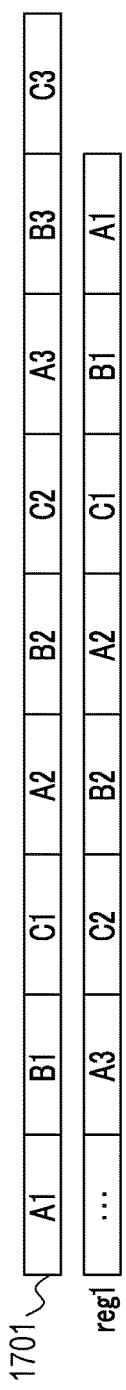

CODE CONVERSION APPARATUS AND METHOD FOR IMPROVING PERFORMANCE IN COMPUTER OPERATIONS

CROSS-REFERENCE TO RELATED APPLICATION

This application is based upon and claims the benefit of priority of the prior Japanese Patent Application No. 2018-77108, filed on Apr. 12, 2018, the entire contents of which are incorporated herein by reference.

FIELD

The embodiment discussed herein is related to a code conversion apparatus and a method for improving performance in computer operations.

BACKGROUND

In computers, a single instruction multiple data (SIMD) instruction, by which a single arithmetic unit performs operations for a plurality of pieces of data in parallel with one another, is increasingly used in order to improve processing performance. The SIMD instruction is especially frequently used by arithmetic processing devices that operate in supercomputers or servers, which are expected to achieve high processing performance. The arithmetic processing devices are also called "processors".

When a processor that supports the SIMD instruction executes the SIMD instruction, the processor transfers data from a memory to a register and performs, using the register, operations on a plurality of SIMD elements included within each certain SIMD width in parallel with one another. The processor then stores results of the operations in the memory in units of the SIMD elements. If the operations are simultaneously performed on four elements, for example, the number of SIMD elements (the number of elements) is four.

It is desirable for a compiler to perform optimal instruction extension in order to increase the speed of a program logic, especially, for example, a repetition process (loop process), described in software. Loop unrolling, software pipelining, loop merging, and various other methods have been proposed as techniques for increasing the speed of a loop process.

With respect to the SIMD instruction, a technique for generating a code including a certain instruction to perform operations of the same type on different pieces of data in parallel with one another in order to improve operation efficiency is known.

Related techniques are disclosed in, for example, Japanese Laid-open Patent Publication No. 2013-206291.

Because a compiler often performs object extension of a SIMD instruction in a loop included in a source code in a horizontal direction of a vector register, the SIMD instruction is usually used in the horizontal direction. In a vertical direction of the vector register, on the other hand, a SIMD instruction is not used or is used in the horizontal direction after the arrangement of data is converted in the horizontal direction.

In the following description, object extension of a SIMD instruction will be referred to as "SIMD extension". Vector registers used for SIMD extension based on a SIMD instruction will be referred to as "SIMD registers".

A data definition of a structure of arrays (SoA) layout is suitable for SIMD extension. The SoA layout is a data definition including a plurality of successive elements. A plurality of elements included in data having an SoA layout may be easily accessed successively.

Because not all elements in each array may be stored in a cache memory in a data definition of an SoA layout, cache efficiency of access of high locality decreases.

Such a problem is posed not only when a SIMD instruction is data having an SoA layout but also when operations are performed on different elements of arrays based on another data definition in parallel with one another.

SUMMARY

According to an aspect of the present invention, provided is a code conversion apparatus including a memory and a processor coupled to the memory. The memory is configured to store therein a first code including a first data definition of a plurality of arrays, a first operation for the plurality of arrays, and a second data definition of an array indicating a result of the first operation. The processor is configured to convert the first data definition and the second data definition included in the first code into a data definition of an array of structures. The processor is configured to convert the first operation included in the first code into a second operation for the array of structures. The processor is configured to generate a second code including a predetermined instruction to perform the second operation on different pieces of data of the plurality of arrays in parallel with one another.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A to 1D are diagrams illustrating SIMD extension for data having an SoA layout;

FIG. 2 is a diagram illustrating a SIMD operation for data having an SoA layout;

FIGS. 7A to 7C are diagrams illustrating a data definition of an array of structures (AoS) layout and a SIMD operation;

FIG. 8 is a diagram illustrating a data definition of a hybrid AoS layout;

FIG. 9 is a diagram illustrating processing performance;

FIGS. 13A and 13B are diagrams illustrating a loop management table;

FIG. 14 is a diagram illustrating an evaluation table;

FIG. 16 is a diagram illustrating conversion for two-dimensional arrays;

FIGS. 17A to 17E are diagrams illustrating SIMD extension employing existing instructions;

DESCRIPTION OF EMBODIMENTS

Figure 3:
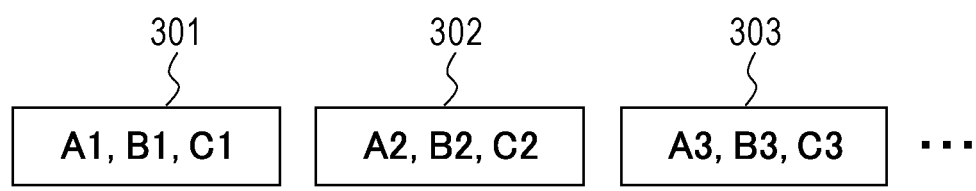
FIG. 3 is a diagram illustrating storage areas for arrays.

An embodiment will be described in detail hereinafter with reference to the drawings.

FIGS. 1A to 1D illustrate an example of SIMD extension in operations for data having an SoA layout described in Fortran. FIG. 1A illustrates an example of a data definition of an SoA layout for one-dimensional arrays A, B, and C. Elements of each array are double-precision real numbers, and the number of elements of each array is n (n is an integer equal to or larger than 2).

FIG. 1B illustrates storage areas of the arrays A, B, and C. Ai denotes an i-th (i=1 to n) element A(i) of the array A, Bi denotes an i-th element B(i) of the array B, and Ci denotes an i-th element C(i) of the array C. A stream including A1 to An is stored successively in an area 101. A stream including B1 to Bn is stored successively in an area 102. A stream including C1 to Cn is stored successively in an area 103. In this case, the three streams may be simultaneously accessed.

FIG. 1C illustrates an example of a source code including a loop of an operation for the arrays A and B. In this example, n is 1,024, and an operation C(i)=A(i)+B(i) is included in a do loop.

FIG. 1D illustrates an example of SIMD extension for the loop illustrated in FIG. 1C. In this example, the number of elements that may be simultaneously processed by a SIMD instruction is four, and the three streams are subjected to successive area access. Each stream, therefore, is accessed in units of four elements using the areas 101 to 103 illustrated in FIG. 1B, and add operations are performed on four elements in the array A and four elements in the array B in parallel with each other. Results of the add operations are then stored in the image output control unit 103 in parallel with each other.

According to the data definition of the SoA layout, a plurality of elements in different arrays are stored in successive areas in a memory. If data used to a SIMD operation is read to a SIMD register from the memory, a plurality of successively stored elements are usually read to the SIMD register successively.

FIG. 2 illustrates an example of a SIMD operation for performing the operation illustrated in FIG. 1C using SIMD registers. Memories 1 to 3 are successive areas in the memory. Memory 1 stores the elements of the array A. Memory 2 stores the elements of the array B. Memory 3 stores the elements of the array C.

The data size of the elements of each array is 8 bytes, and SIMD registers 1 to 3 are each capable of storing eight pieces of 64-bit data. The number of elements that may be simultaneously processed by a SIMD instruction, therefore, is eight.

First, A1 to A8, which are eight successive elements starting at an initial address of memory 1, are read by a SIMD load instruction and successively written to SIMD register 1 horizontally. Simultaneously, B1 to B8, which are eight successive elements starting at an initial address of memory 2, are read and successively written to SIMD register 2 horizontally.

Next, add operations are performed on the eight pieces of data in SIMD registers 1 and 2 in parallel with each other, and C1 to C8, which are results of the add operations, are written to SIMD register 3. C1 to C8 are then successively read from SIMD register 3 and sequentially written from an initial address of memory 3. A SIMD operation for one loop is thus completed, and the same process is performed on next eight elements in a SIMD operation for a next loop.

Since results of a SIMD operation are successively stored in SIMD register 3, the results may be stored in memory 3 as data having an SoA layout and rearrangement of the results is unnecessary.

A data definition of an SoA layout, however, poses a problem that access locality decreases when a plurality of elements of arrays included in an SoA are accessed. In application programs for business purposes, for example, certain pieces of data are often repeatedly used, which increases the access locality of data. In the case of data having an SoA layout, not all elements of each array may necessarily be stored in a cache memory, and cache efficiency of access of high locality decreases.

In this case, cache efficiency and processing performance improve if discrete pieces of data defined in an AoS layout, not in an SoA layout, are used. In order to improve processing performance, therefore, a programmer might change a data definition of an SoA layout included in a source code to a data definition of an AoS layout.

FIG. 3 illustrates an example of storage areas for arrays A, B, and C defined in an AoS layout. A1, B1, and C1 are successively stored in an area 301. A2, B2, and C2 are successively stored in an area 302. A3, B3, and C3 are successively stored in an area 303. If a certain combination of Ai, Bi, and Ci is repeatedly used frequently in an application program, cache efficiency is improved by keeping the combination in the cache memory.

However, because successive elements are usually stored in a SIMD register horizontally in SIMD extension, it is difficult to perform a SIMD operation on data having an AoS layout using SIMD registers.

Because an area involved in one operation is long in a data definition of an SoA layout, a translation lookaside buffer (TLB) error due to excessive page size caused by successive area access might frequently occur, thereby deteriorating processing performance. If hardware prefetching or software prefetching is redundantly performed on successive streams, processing performance further deteriorates.

In the examples illustrated in FIGS. 1A to 1D and 2, hardware resources are consumed by hardware prefetching or software prefetching performed for each of the streams of the arrays A, B, and C. Since data is redundantly written to the cache memory, various deteriorations in performance occur, such as an increase in the number of instructions input to pipelines, hindrance to scheduling, and a decrease in transfer speed due to consumption of bus width.

Figure 4:
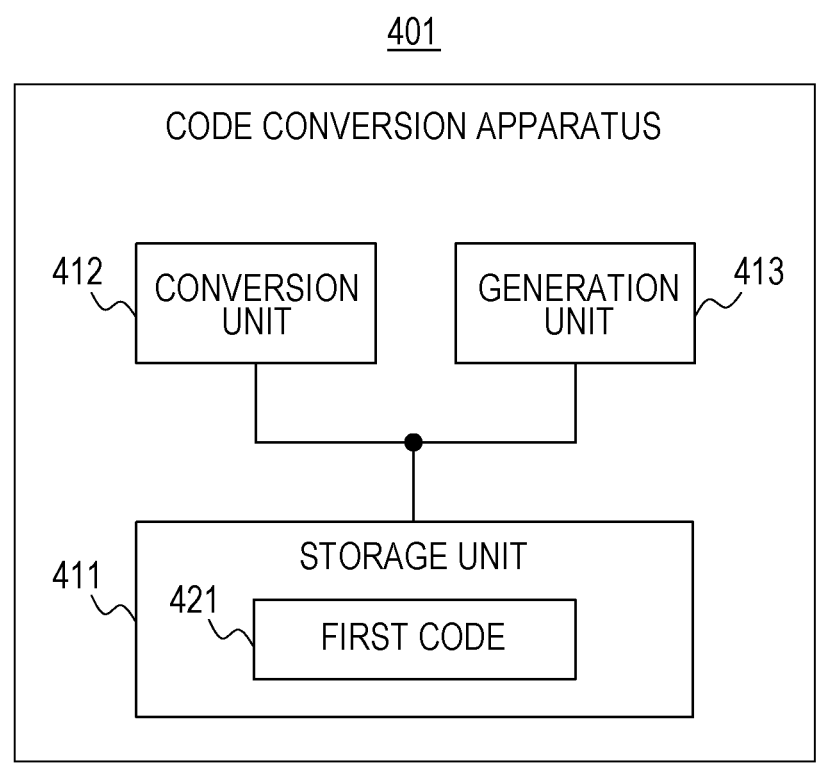
FIG. 4 is a diagram illustrating the functional configuration of a code conversion apparatus.

FIG. 4 illustrates an example of the functional configuration of a code conversion apparatus according to the embodiment. A code conversion apparatus 401 illustrated in FIG. 4 includes a storage unit 411, a conversion unit 412, and a generation unit 413. The storage unit 411 stores a first code 421 that includes a data definition of a plurality of arrays, certain operations for the arrays, and a data definition of an array indicating results of the certain operations.

Figure 5:
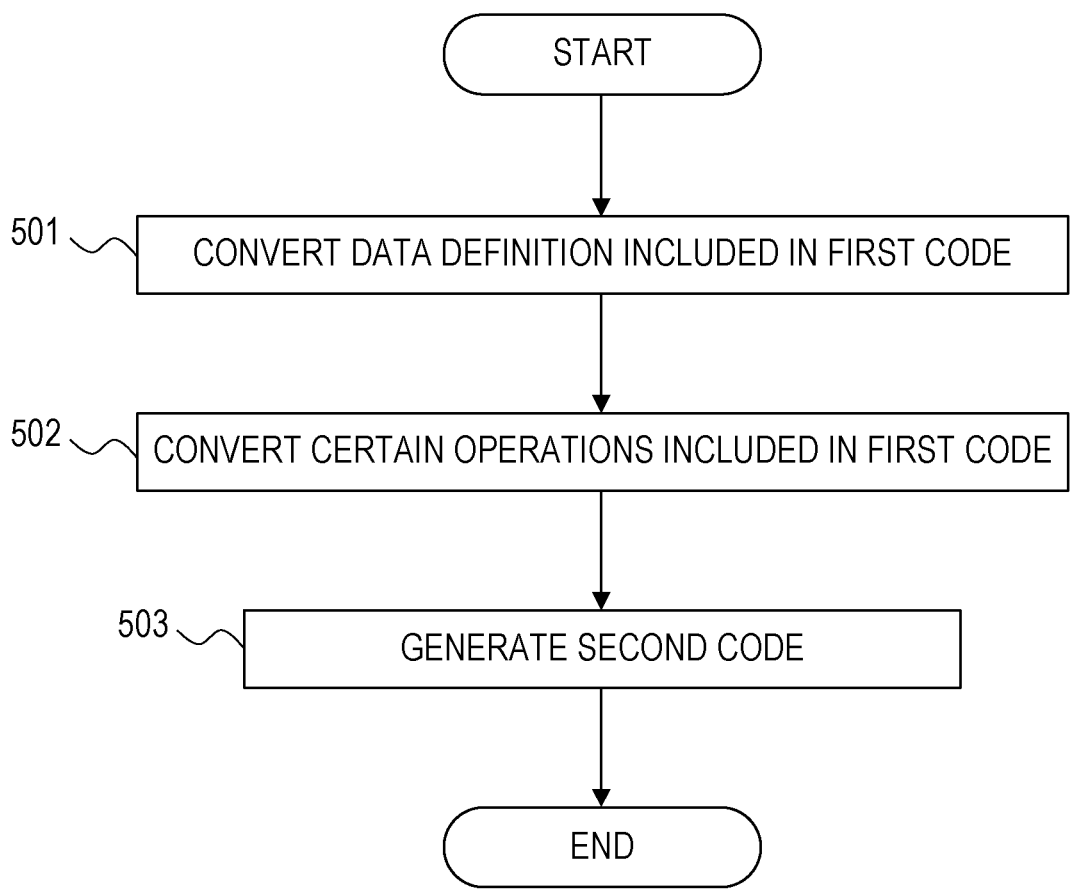
FIG. 5 is a flowchart illustrating code conversion.

FIG. 5 is a flowchart illustrating an example of code conversion performed by the code conversion apparatus 401 illustrated in FIG. 4. First, the conversion unit 412 converts the data definition of the plurality of arrays and the data definition of the array indicating the results of the operations included in the first code 421 into a data definition of an AoS (step 501). Next, the conversion unit 412 converts the certain operations included in the first code 421 into operations for the AoS (step S502). The generation unit 413 then generates, for different pieces of data in the plurality of arrays, a second code including certain instructions to perform the operations for the AoS in parallel with one another (step 503).

With the code conversion apparatus 401 illustrated in FIG. 4, there is improvement in the performance of operations performed in parallel with one another on different elements in arrays whose access locality is high.

Figure 6:
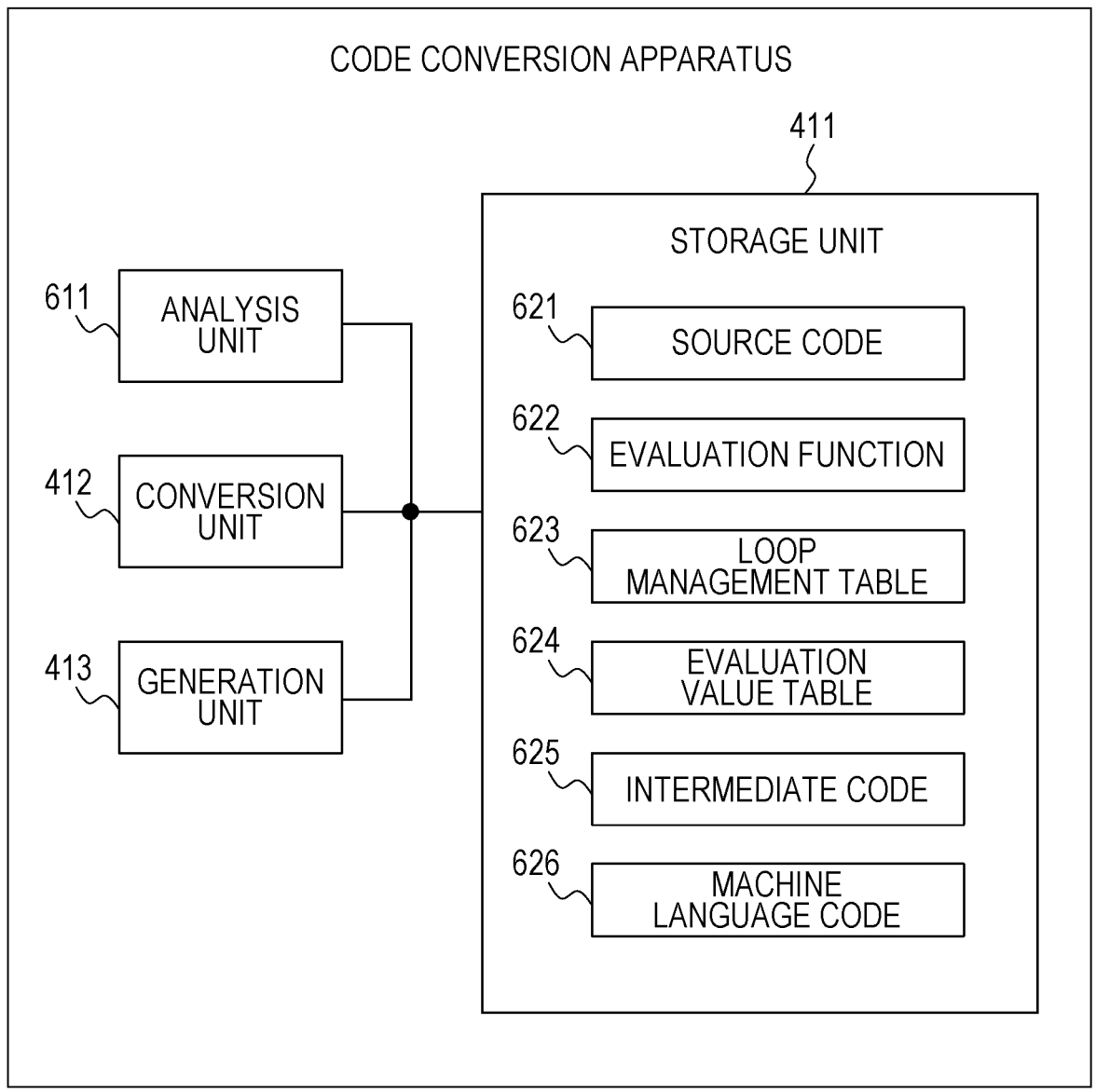
FIG. 6 is a diagram illustrating a specific example of the functional configuration of the code conversion apparatus.

FIG. 6 illustrates a specific example of the code conversion apparatus 401 illustrated in FIG. 4. The code conversion apparatus 401 illustrated in FIG. 6 includes the storage unit 411, the conversion unit 412, the generation unit 413, and an analysis unit 611 and converts a source code 621, which is described in a high-level language into a machine language code 626. The source code 621 may be, for example, a code described in Fortran, C, C++, Lisp, or the like. The code conversion apparatus 401 is also called a "compiler".

The storage unit 411 stores the source code 621 and an evaluation function 622. The source code 621 corresponds to the first code 421 illustrated in FIG. 4 and is also called a "source program". The evaluation function 622 is used to calculate an evaluation value of each array included in the source code 621. The calculated evaluation value indicates a degree at which each array suits a data definition of an AoS layout.

The analysis unit 611 analyzes the source code 621 in accordance with an optimization instruction input by a user. The analysis unit 611 generates a loop management table 623 based on a result of the analysis and stores the loop management table 623 in the storage unit 411. The loop management table 623 includes, for each loop included in the source code 621, attributes such as the number of dimensions of each array included in the loop, the number of appearances, and a subscript for each dimension.

The conversion unit 412 refers to the loop management table 623 and extracts conversion candidate arrays whose data definition is to be converted. The conversion unit 412 then calculates evaluation values of the conversion candidate arrays using the evaluation function 622, generates an evaluation value table 624 including the calculated evaluation values, and stores the evaluation value table 624 in the storage unit 411.

Next, the conversion unit 412 refers to the evaluation value table 624, selects conversion target arrays from the conversion candidate arrays, and converts a data definition of the selected arrays into a data definition of an AoS layout. The conversion target arrays include a plurality of arrays on which certain operations are performed and an array indicating results of the certain operations performed on the arrays. The data definition of the conversion target arrays may have an SoA layout or a layout other than an SoA layout.

Next, the conversion unit 412 converts the certain operations included in the source code 621 into operations for data having an AoS layout, generates an intermediate code 625 including the data definition of the AoS layout (as converted above) and the operations obtained as a result of the conversion, and stores the intermediate code 625 in the storage unit 411.

The generation unit 413 optimizes the intermediate code 625 by performing SIMD extension on the operations included in the intermediate code 625, generates a machine language code 626 including SIMD instructions to read and write data having an AoS layout, and stores the machine language code 626 in the storage unit 411. The machine language code 626 corresponds to the second code and is also called a "machine language program".

The code conversion apparatus 401 illustrated in FIG. 6 increases cache efficiency of a processor that executes the machine language code 626 by converting a data definition of arrays into a data definition of an AoS layout while focusing upon data whose access locality is high. Since different elements in the plurality of arrays are locally arranged in the data definition of an AoS layout after the conversion, data regarding these elements are expected to remain in the cache memory as a group. When the access locality of the arrays is high, therefore, a cache error rate is reduced, thereby improving cache efficiency. As a result, the performance of SIMD operations for the arrays improves.

By converting a data definition of an SoA layout into a data definition of an AoS layout, an area used in one operation is shortened, and TLB errors due to excessive page size caused by successive area access are reduced. A plurality of streams are integrated together as a single stream, and consumption of hardware resources due to hardware prefetching and the like is reduced. Limited hardware resources are therefore efficiently used. As a result, processing performance of the processor improves, and power consumption decreases.

The generation unit 413 may use, as SIMD instructions to read and write data having an AoS layout, existing instructions to access SIMD registers or newly defined AoS-dedicated instructions. As the AoS-dedicated instructions, a dedicated load instruction to read data having an AoS layout from a memory and write the data to a SIMD register and a dedicated store instruction to read data from a SIMD register and write the data to a memory in an AoS layout are defined.

The dedicated load instruction is an instruction to read data regarding a plurality of AoSs successively stored in a memory and write data regarding a plurality of arrays included in each AoS to a plurality of SIMD registers.

The dedicated store instruction, on the other hand, is an instruction to read data regarding a plurality of arrays included in each AoS and write the data at a position of the AoS stored in a memory. By executing the dedicated store instruction, therefore, data regarding an array indicating results of operations are read from a certain SIMD register and written at a position of an array indicating results of operations included in each AoS stored in a memory.

The dedicated load instruction is used to directly extend elements in a memory in a vertical direction of a SIMD register, and the dedicated store instruction is used to extract elements extended in the vertical direction of a SIMD register and store the elements in a memory. By using these AoS-dedicated instructions, vertical SIMD extension is efficiently performed instead of horizontal SIMD extension.

The processor supports the dedicated load instruction and the dedicated store instruction to further improve processing performance for data having an AOS layout.

FIGS. 7A to 7C illustrate an example of a data definition of an AoS layout and a SIMD operation. FIG. 7A illustrates an example of a data definition of an AoS layout for one-dimensional arrays A, B, and C. A structure struct includes elements of the arrays A, B, and C. The elements of each array are double-precision real numbers, and the number of elements of each array is 1,024. An AoS St is an array of the structure struct, and the number of elements of the AoS St, too, is 1,024. In this case, pieces of data Ai, Bi, and Ci included in an i-th (i=1 to 1,024) element of the AoS St are successively stored in a memory 701 and subjected to successive area access.

FIG. 7B illustrates an example of a source code obtained by describing a loop of an operation for the arrays A and B using the AoS St. In this example, an operation St(i) % C=St(i) % A+St(i) % B is included in a do loop. St(i) % A indicates an element of the array A included in the i-th element of the AoS St, St(i) % B indicates an element of the array B included in the i-th element of the AoS St, and St(i) % C indicates an element of the array C included in the i-th element of the AoS St.

FIG. 7C illustrates an example of SIMD extension for the loop illustrated in FIG. 7B. In this example, the number of elements that may be simultaneously processed by a SIMD instruction is four, and only one stream stored in the memory 701 is subjected to successive area access.

As a result, 12 pieces of data A1 to C4 corresponding to four elements of the AoS St are read from an initial address of the memory 701 illustrated in FIG. 7A and sequentially written to SIMD registers 1 to 3 vertically. Addition operations are then performed on the four elements of the array A stored in SIMD register 1 and the four elements of the array B stored in SIMD register 2 in parallel with each other, and then four results of the addition operations are written to SIMD register 3.

Since the simultaneously accessed pieces of data Ai, Bi, and Ci are stored in the memory 701 close to one another, the pieces of data Ai, Bi, and Ci are arranged in the cache memory close to one another. Unlike in the case of an SoA layout, therefore, it is unlikely that some of the pieces of data Ai, Bi, and Ci are removed from the cache memory.

By caching data, the data may be stored in the cache memory until the data is used in a next processing step. As a result, access cost in next access is reduced. In the case of a bigger data set, however, not all the data might be stored in the cache memory and updated before the data is used next time. It is therefore effective to add only arrays that are frequently used simultaneously to members of a structure having an AoS layout.

A hybrid AoS layout, in which loading order of data having an SoA layout is supported while securing data adjacency, which is a characteristic of data having an AoS layout, may be used as a data definition, instead.

FIG. 8 illustrates an example of a data definition of a hybrid AoS layout. A structure Hybrid_struct includes eight elements of the array A, eight elements of the array B, and eight elements of the array C. The elements of each array are double-precision real numbers, and the number of elements of each array is 1,024. An AoS St is an array of the structure Hybrid_struct, and the number of elements of the AoS St is 128.

In this case, an i-th (i=1 to 128) element of the AoS St includes pieces of data A(8*(i−1)+1) to A(8*i), B(8*(i−1)+1) to B(8*i), and C(8*(i−1)+1) to C(8*i). These 24 pieces of data are successively stored in a memory 801 and subjected to successive area access. One subscript of the AoS St, therefore, specifies 24 pieces of data as access targets.

According to the data definition of the hybrid AoS layout illustrated in FIG. 8, the processor may simultaneously load eight pieces of data from any of the arrays A, B, and C as in the case of the SIMD operation illustrated in FIG. 2. In this case, even if elements of the arrays A, B, and C having the same subscript are not arranged next to one another, the elements are expected to be stored on the same memory page, since the elements are located sufficiently close to one another.

Since elements of a plurality of different arrays are locally arranged, cache efficiency is likely to improve. Since an area used in one operation is shortened, TLB errors due to excessive page size caused by successive area access, too, are likely to decrease.

The code conversion apparatus 401 thus converts a data definition of arrays into an AoS layout or a hybrid AoS layout in accordance with characteristics of data used by a program. By switching a data definition in accordance with data characteristics and operations performed on data, the entirety of a program is optimized.

FIG. 9 illustrates an example of processing performance according to a combination of program characteristics and a data definition. A checkmark indicates that processing speed may be increased. A triangle indicates that processing speed may be partly increased. An X indicates that it is difficult to increase processing speed.

If there is no access locality of data, processing performance for a data definition of an SoA layout is higher than that for a data definition of an AoS layout. If there is access locality of data, on the other hand, processing performance for an AoS layout is higher than that for a data definition of an SoA layout.

If there is access locality of data, therefore, processing performance is expected to be significantly improved by converting a data definition of an SoA layout included in the source code 621 into a data definition of an AoS layout and certain operations into operations for data having an AoS layout.

As loads of hardware resources, a load due to hardware prefetching (HPF) and a load due to TLB errors are taken into consideration. Because the load due to HPF and the load due to TLB errors are both large for a data definition of an SoA layout, processing performance is low. In the case of a data definition of an AoS layout, on the other hand, processing performance is high because there is no load due to HPF and the load due to TLB errors is small.

By converting a data definition of an SoA layout included in the source code 621 into a data definition of an AoS layout and certain operations into operations for data having an AoS layout, therefore, the loads of hardware resources are reduced, thereby further improving processing performance.

If horizontal SIMD instructions are supported in a SIMD support condition of the processor, processing performance for a data definition of an SoA layout is higher than that for a data definition of an AoS layout. In the case of a data definition of an AoS layout, data is rearranged horizontally after being stored in a SIMD register. As a result, an effect produced by a SIMD operation might be offset, and performance might deteriorate.

If vertical SIMD instructions are supported, on the other hand, processing performance for a data definition of an AoS layout is higher than that for a data definition of an SoA layout. Processing performance for data having an AoS layout further improves especially when AoS-dedicated instructions are supported.

The conversion unit 412 may extract conversion candidate arrays from arrays included in the source code 621 using one of the following extraction methods.

M1: Extraction of conversion candidates based on a static analysis of the source code 621

M2: Extraction of conversion candidates based on a control statement described in the source code 621

M3: Extraction of conversion candidates based on profile information

If the extraction method M1 is used, the user selects a compiler option indicating conversion of a data definition, and the conversion unit 412 extracts conversion candidate arrays in accordance with the selected compiler option. As the compiler option indicating conversion of a data definition, one of the following is used.

-KAos: A compiler option for automatically extracting conversion candidates from all arrays -KAos(A, B): A compiler option for extracting arrays having array names explicitly specified by the user as conversion candidates "A" and "B" in -KAos(A, B) indicate array names specified by the user. In this case, among arrays having the array names A and B, arrays having the same number of dimensions and the same number of elements are extracted as conversion candidates. A name other than -KAos may be used as a name of a compiler option, instead.

If -KAos is selected, conversion candidates are automatically extracted even if the user does not explicitly specify arrays. If -KAos(A, B) is selected, on the other hand, arrays explicitly specified by the user are extracted as conversion candidates.

Figure 10:
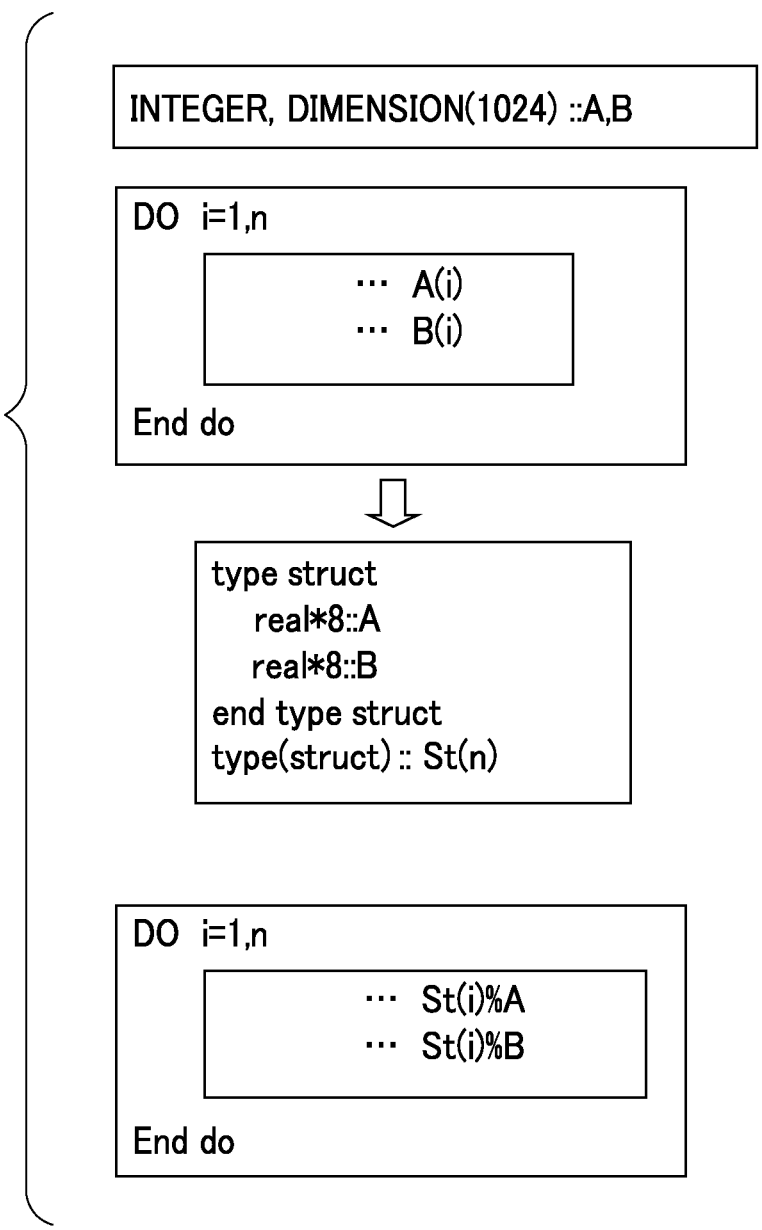
FIG. 10 is a diagram illustrating an extraction method.

FIG. 10 illustrates an example of the extraction method M1. If -KAos(A, B) is selected, one-dimensional arrays A and B are extracted from a do loop as conversion candidates. If the arrays A and B are selected as conversion targets, a data definition of these arrays is converted into a data definition of the AoS St, and A(i) and B(i) in the do loop are converted into St(i) % A and St(i) % B, respectively. The number of dimensions of arrays to be extracted may be two or more, instead.

If the extraction method M2 is used, the user describes a control statement that explicitly specifies conversion candidate arrays in the source code 621, and the conversion unit 412 extracts the conversion candidate arrays in accordance with the control statement. As the control statement, for example, an object constraint language (OCL) statement in Fortran, #pragma in C, or the like may be used. The control statement may include array names, the number of dimensions, and the number of elements. By using the control statement, arrays explicitly specified by the user may be extracted as conversion candidates.

Figure 11:
FIG. 11 is a diagram illustrating another extraction method.

FIG. 11 illustrates an example of the extraction method M2. If arrays A, B, and C are selected by an OCL statement "!ocl AOS(A, B, C)" as conversion candidates, two-dimensional arrays A, B, and C are extracted from a do loop. If the arrays A, B, and C are selected as conversion targets, a data definition of these arrays is converted into a data definition of the AoS St. A(i, j), B(i, j), and C(i, j) in the do loop are also converted into St(i, j) % A, St(i, j) % B, and St(i, j) % C, respectively. The number of dimensions of arrays to be extracted may be one or three or more, instead.

If the extraction method M3 is used, the conversion unit 412 obtains profile information indicating an access frequency of each array in a loop process included in the source code 621. The conversion unit 412 then extracts arrays that are frequently accessed simultaneously as conversion candidates using the obtained profile information. If arrays in the same loop are frequently accessed, data regarding these arrays becomes likely to remain in the cache memory in the same period by converting a data definition of these arrays into a data definition of an AoS layout.

Figure 12:
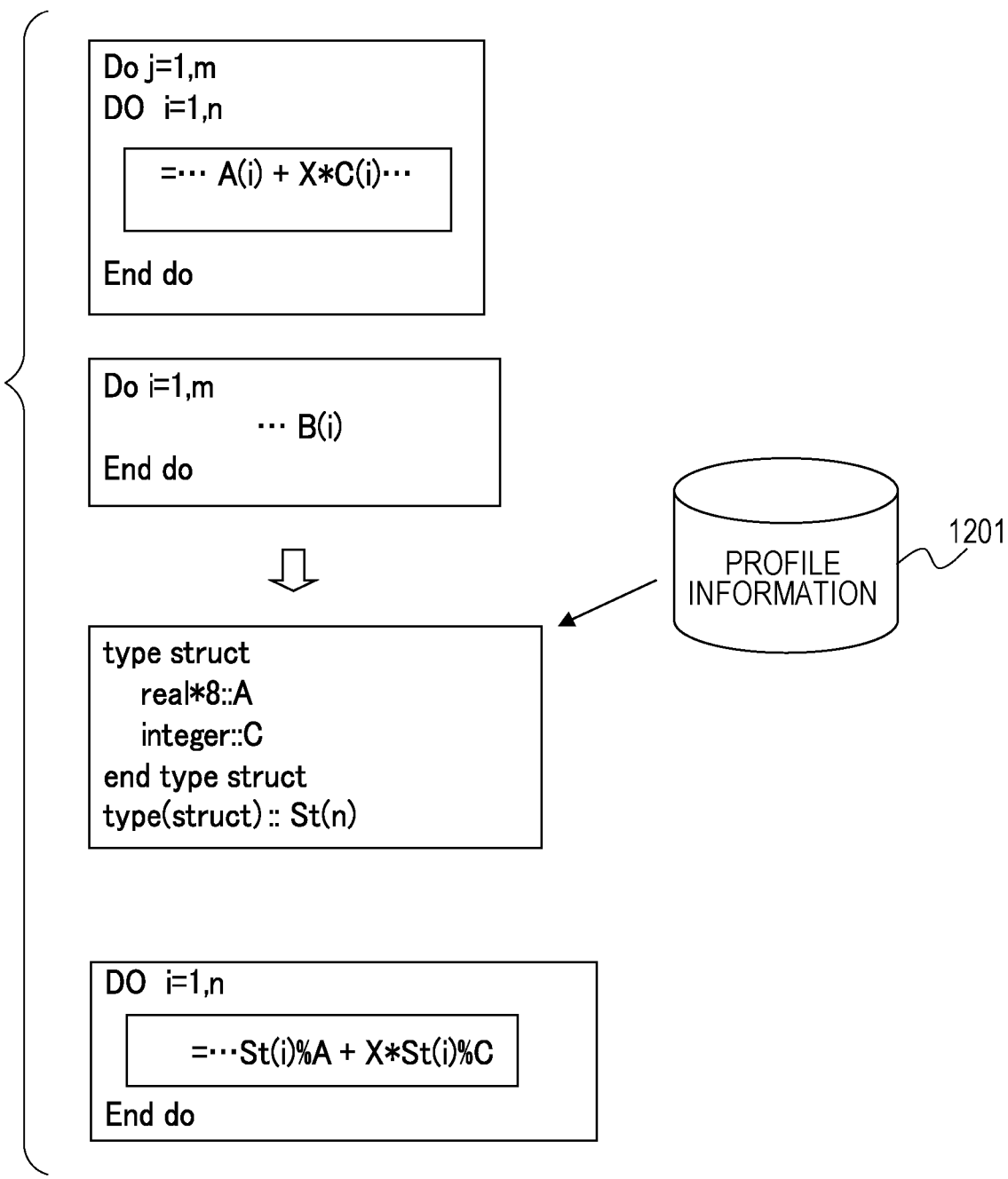
FIG. 12 is a diagram illustrating another extraction method.

FIG. 12 illustrates an example of the extraction method M3. Profile information 1201 indicates that it is likely that arrays A and C are frequently accessed simultaneously in a high-cost loop process and an array B is not accessed simultaneously with another array. In this case, the one-dimensional arrays A and C are extracted from a do loop as conversion candidates. If the arrays A and C are selected as conversion targets, a data definition of these arrays is converted into a data definition of the AoS St, and A(i) and C(i) in the do loop are converted into St(i) % A and St(i) % C, respectively. The number of dimensions of arrays to be extracted may be two or more, instead.

FIGS. 13A and 13B illustrate an example of the loop management table 623 for a loop included in the source code 621. FIG. 13A illustrates an example of a do loop, and FIG. 13B illustrates an example of the loop management table 623 generated by the analysis unit 611 by analyzing the do loop illustrated in FIG. 13A. The loop management table 623 illustrated in FIG. 13B includes the following items.

Variable: Description of arrays in the loop (includes subscripts)

Array name: Names of arrays (does not include subscripts)

No. of dimensions: The number of dimensions of arrays

No. of appearances: The number of times of description of arrays in the loop p-th dimension (p=1 to P): A p-th subscript of arrays (includes constants)

Group No.: Identification information indicating groups of arrays having the same subscripts The conversion unit 412 refers to the loop management table 623, searches for arrays having the same subscripts, and provides the same group numbers to the arrays. In the loop management table 623 illustrated in FIG. 13B, the following groups are extracted as groups of arrays having the same subscripts.

{A(i), B(i)}
{AA(i, j), BB(i, j)}
{CC(x, y), DD(x, y)}
{α(W(i)), β(WW)}

A subscript of arrays α and β is W(i), which indicates indirect referencing and may be regarded as the same subscript. These arrays, therefore, are classified into the same group. Even if a subscript indicating indirect referencing is different between arrays, the arrays are classified into the same group when it may be determined from profile information or the like that such subscripts are the same during operation.

Although a static area is used as a data area of arrays in the do loop illustrated in FIG. 13A, arrays whose data area is dynamically obtained may be registered in the loop management table 623.

The conversion unit 412 extracts conversion candidate arrays from the arrays included in the loop management table 623 using one of the extraction methods M1 to M3. If the compiler option -KAos is selected in the extraction method M1, the conversion unit 412 extracts arrays classified into a group as conversion candidates.

If arrays are explicitly specified by a compiler option or a control statement in the extraction method M1 or M2, the conversion unit 412 checks whether the specified arrays have the same group number in the loop management table 623. If so, the conversion unit 412 determines the arrays as conversion candidates. If not, the conversion unit 412 excludes the arrays from conversion candidates.

If profile information is selected in the extraction method M3, the conversion unit 412 extracts, using the selected profile information, arrays that are frequently accessed simultaneously as conversion candidates.

As the evaluation function 622 for arrays having an array name Q, for example, the following evaluation function E(Q) may be used.

$$E(Q)=(C(Q)/S)*w1+(M(Q)/G(Q))*w2 \quad (1)$$

S in expression (1) denotes the total number of arrays included in a loop, and C(Q) denotes the number of appearances of an array Q in the loop. C(Q)/S, therefore, denotes a ratio (appearance ratio) of the array Q in the loop.

G(Q) denotes the total number of arrays having the same group number as the array Q, and M(Q) denotes the number of appearances of the array Q in a group indicated by the group number. M(Q)/G(Q), therefore, denotes a ratio (matching ratio) of the array Q in the group.

Since an array whose appearance ratio is high is frequently accessed, it is effective to convert a data definition of such an array into a data definition of an AoS layout. Similarly, since an array whose matching ratio is high is frequently accessed, it is effective to convert a data definition of such an array into a data definition of an AoS layout. w1 denotes a weighting coefficient relative to the appearance ratio, and w2 denotes a weighting coefficient relative to the matching ratio.

The conversion unit 412 calculates a result of the evaluation function E(Q) (evaluation value) using the number of appearances of each array registered in the loop management table 623. If w1=1 and w2=2, for example, an evaluation value of arrays having an array name A is calculated as follows based on the loop management table 623 illustrated in FIG. 13B.

S=14: The total number of arrays included in the loop is 14 as follows.
A(i), B(i), AA(i, j), BB(i, j), AA(i+1, j), AA(x, z), BB(i+2, j), BB(z, c), CC(x, y), A(i+2), AA(i, j), DD(x, y), α(W(i)), and β(W(i))

C(A)=2: The number of appearances of the array A is two, namely A(i) and A(i+2)

G(A)=2: The total number of arrays having the same group number "1" as the array A is two, namely A(i) and B(i)

M(A)=1: The number of appearances of the array A in a group indicated by the group number "1" is one, namely A(i)

$$E(A)=(2/14)*1+(1/2)*2=1.14 \quad (2)$$

FIG. 14 illustrates an example of the evaluation value table 624 for conversion candidate arrays. In this example, all arrays belonging to four groups having group numbers "1" to "4" have been extracted as conversion targets. The evaluation value table 624 illustrated in FIG. 14 includes a group number, array names Q, C(Q), w1, M(Q), G(Q), and w2, an evaluation value, and a total. The evaluation value indicates an evaluation value of each array calculated using the evaluation function E(Q) in expression (1), and the total indicates the sum of evaluation values of arrays belonging to the same group.

The conversion unit 412 refers to the evaluation value table 624 and selects arrays belonging to groups whose totals are larger than a threshold as conversion targets. The conversion unit 412 may also select arrays of each group whose evaluation values are larger than a threshold as conversion targets. These thresholds may be certain values set in advance or values set by the user.

If the threshold for totals is 2.2, for example, A(i) and B(i) belonging to the group having the group number "1" illustrated in FIG. 14 and AA(i, j) and B(i, j) belonging to the group having the group number "2" are selected as conversion targets.

The conversion unit 412 may add the items of the evaluation value table 624 to the loop management table 623 to integrate the two tables, instead of generating the evaluation value table 624 separately from the loop management table 623.

The evaluation function E(Q) may be a function including only either the appearance ratio of the array Q or the matching ratio of the array Q. The evaluation function E(Q) may include an attribute other than the appearance ratio and the matching ratio. Information when a program has been executed, which may be obtained from profile information, for example, may be used as an attribute of the evaluation function E(Q). The information may be the number of times of access to each array, information regarding processor events such as cache errors, or a measured value (experience value) or a logical value obtained by the processor.

The code conversion apparatus 401 may calculate an evaluation value using the evaluation function E(Q) provided from the outside as a parameter of a compiler, instead of the evaluation function E(Q) stored in advance. The code conversion apparatus 401 may feed back information obtained when a program has been executed as learning data to automatically generate the evaluation function E(Q).

The conversion unit 412 adds an AoS of arrays selected as conversion targets to the source code 621. If arrays A and B are selected as conversion targets, for example, the conversion unit 412 defines a structure struct of the arrays A and B and then defines an AoS having an arbitrary array name as an array of the structure. The conversion unit 412 then adds the data definition to a data description part of the source code 621.

type struct
attribute 1::A
attribute 2::B
end type struct
type(struct)::St(n)

In this example, an AoS having an array name St is defined. The number n of elements of the AoS St is the same as the number of elements of the arrays A and B.

Next, the conversion unit 412 generates the intermediate code 625 by replacing a description of the arrays A and B included in the source code 621 with a description in which the array name of the AoS St is used.

A( )→St( ) % A
B( )→St( ) % B

Figure 15:
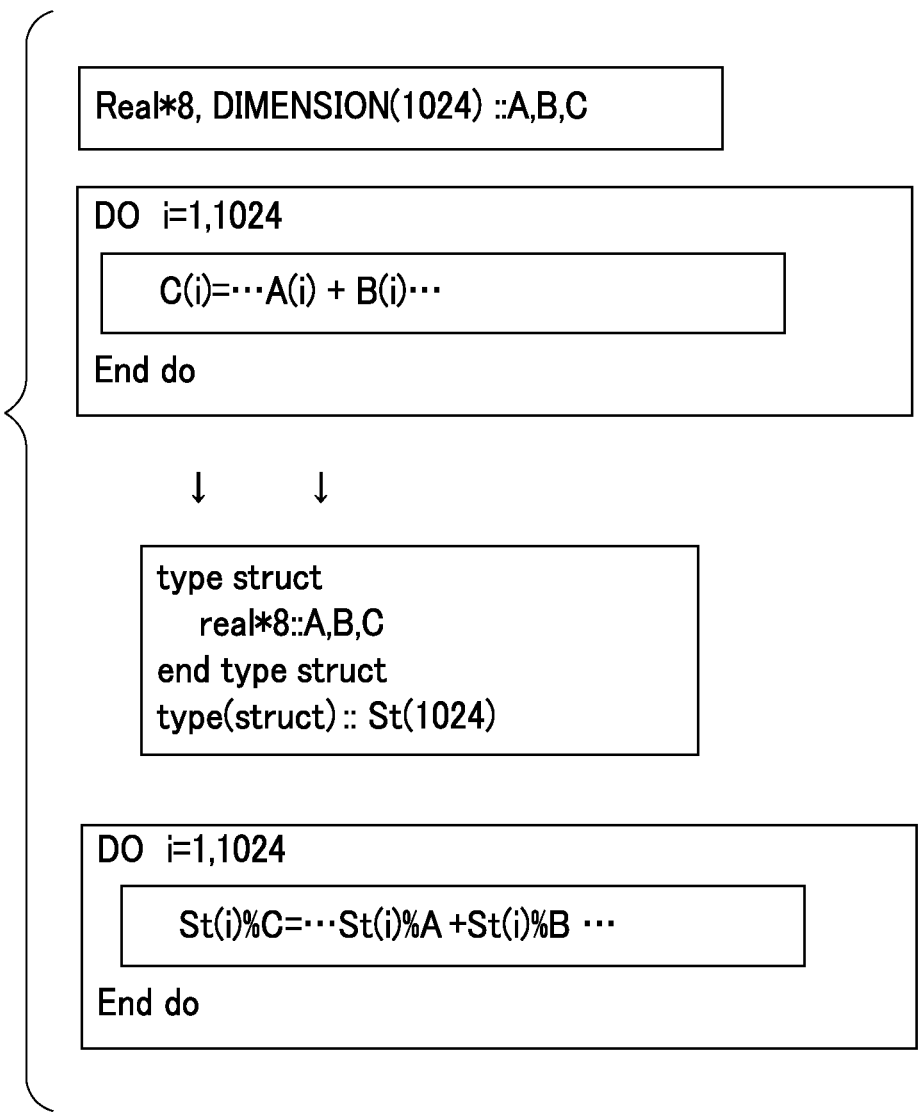
FIG. 15 is a diagram illustrating conversion for one-dimensional arrays.

FIG. 15 illustrates an example of conversion of a data definition and operations for one-dimensional arrays A, B, and C. If the source code 621 includes the one-dimensional arrays A, B, and C, a structure struct including elements of the arrays A, B, and C is defined, and an AoS St is defined as an array of the structure. The number of elements of the AoS St is 1,024. An operation C(i)= . . . A(i)+B(i) . . . in a do loop is replaced by an operation St(i) % C= . . . St(i) % A+St(i) % B . . . .

FIG. 16 illustrates an example of conversion of a data definition and calculations for two-dimensional arrays A, B, and C. If the source code 621 includes the two-dimensional arrays A, B, and C, a structure struct including elements of the arrays A, B, and C is defined, and an AoS St is defined as an array of the structure. Subscripts i and j of the AoS St are integers within a range of 1 to 1,024. An operation C(i, j)=A(i, j)+B(i, j) in a do loop is replaced by an operation St(i, j) % C=St(i, j) % A+St(i, j) % B.

The conversion unit 412 may change array names of the arrays A and B in the intermediate code 625, instead of in the source code 621.

Next, the generation unit 413 generates the machine language code 626 by performing SIMD extension on the intermediate code 625 using existing instructions or AoS-dedicated instructions.

FIGS. 17A to 17E illustrate an example of SIMD extension employing existing instructions. Data regarding arrays A, B, and C having an AoS layout is successively stored in a memory 1701, and the data size of elements of each array is 8 bytes. reg1, reg4, reg5, and regio are SIMD registers capable of storing a plurality of pieces of 64-bit data.

FIG. 17A illustrates an example of a load instruction. The processor executes a load instruction ld3 reg1,addr to read pieces of data A1 to C3 having an AoS layout from the memory 1701 and successively writes the pieces of data A1 to C3 to reg1 horizontally.

FIG. 17B illustrates an example of a select instruction to the array A. First, the processor executes an instruction mov regx,(0x6&0x3&0x0) to write element numbers 0, 3, and 6 indicating positions of the elements A1 to A3 of the array A in reg1 to a register regx.

Next, the processor executes a select instruction select reg4,reg1,regx,3 to read three elements indicated by the three element numbers in regx from reg1 and successively writes the three elements to reg4 horizontally. The select instruction is an instruction to specify positions of data in the array A included in each AoS, read data at the specified positions, and successively write the data to reg4.

FIG. 17C illustrates an example of a select instruction to the array B. First, the processor executes mov regx, (0x7&0x4&0x1) to write element numbers 1, 4, and 7 indicating positions of elements B1 to B3 of the array B in reg1 to the register regx.

Next, the processor executes a select instruction select reg5,reg1,regx,3 to read the three elements indicated by the three element numbers in regx from reg1 and successively write the three elements to reg5 horizontally. The select instruction is an instruction to specify positions of data in the array B included in each AoS, read data at the specified positions, and successively write the data to reg5.

The processor may also write A1 to A8 to register 4 for other elements of the array A by executing the select instruction illustrated in FIG. 17A. The processor may also write B1 to B8 to register 5 for other elements of the array B by executing the select instruction illustrated in FIG. 17B.

FIG. 17D illustrates an example of a SIMD instruction employing reg4 to reg6. The processor executes a SIMD instruction ADD reg6,reg4,reg5 to add Ai (i=1 to 8) stored in reg4 and Bi stored in reg5 in parallel with each other and write results Ci of the addition to reg6.

FIG. 17E illustrates an example of a scatter instruction. First, the processor executes a load instruction ldr x1,&A1 to calculate storage initial addresses of the results Ci (i=1 to 8) in the memory 1701 and write the storage initial addresses to register x1, which is not illustrated. Storage initial addresses of C1, C2, and C3, for example, are 16, 40, and 64, respectively.

Next, the processor executes an instruction mov regx,(64, 40,16) to write the storage initial addresses of C1 to C3 stored in register X1 to regx. The processor may also write storage initial addresses of C1 to C8 to regx for other elements of the array C by executing the same instruction.

Next, the processor executes a scatter instruction scatter reg6,(x1,regx),3 to read three elements C1 to C3 from reg6 and write the elements C1 to C3 to the memory 1701 at addresses indicated by the three elements in regx. The scatter instruction is an instruction to read data regarding the array C from reg6, specify positions of the data regarding the array C included in each AoS stored in the first display field 1701, and write the read data at the specified positions.

The processor may also write C1 to C8 to the memory 1701 for other elements of the array C by executing the same instruction.

In the SIMD extension employing existing instructions illustrated in FIGS. 17A to 17E, SIMD operations may be performed on data having an AoS layout even if AoS-dedicated instructions are not defined.

Figure 18A:
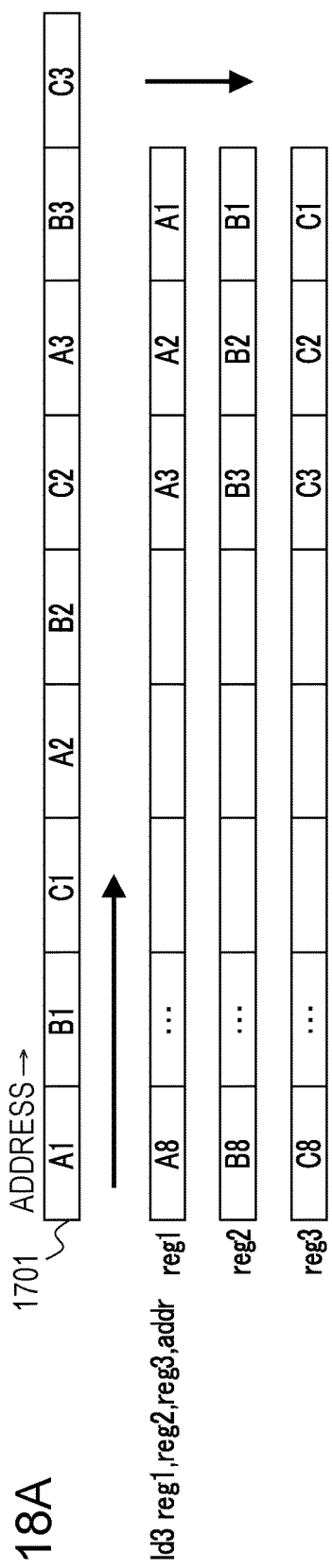
FIGS. 18A to 18C are diagrams illustrating SIMD extension employing AoS-dedicated instructions.
Figure 18B:
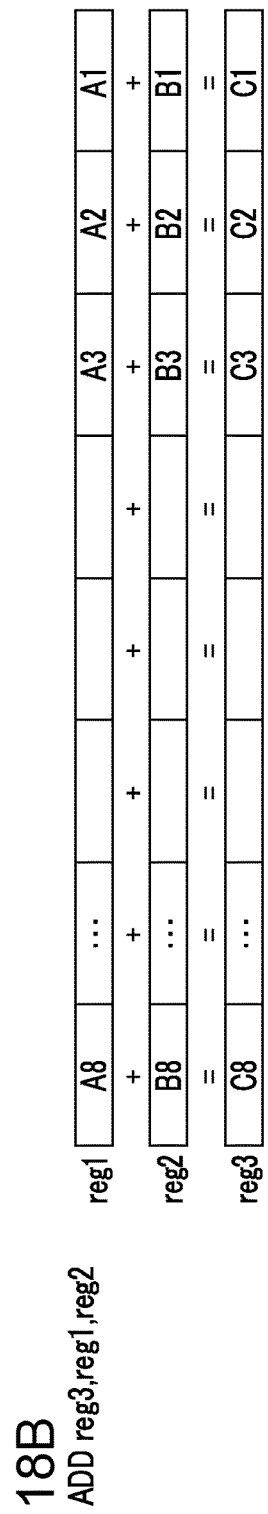
Figure 18C:
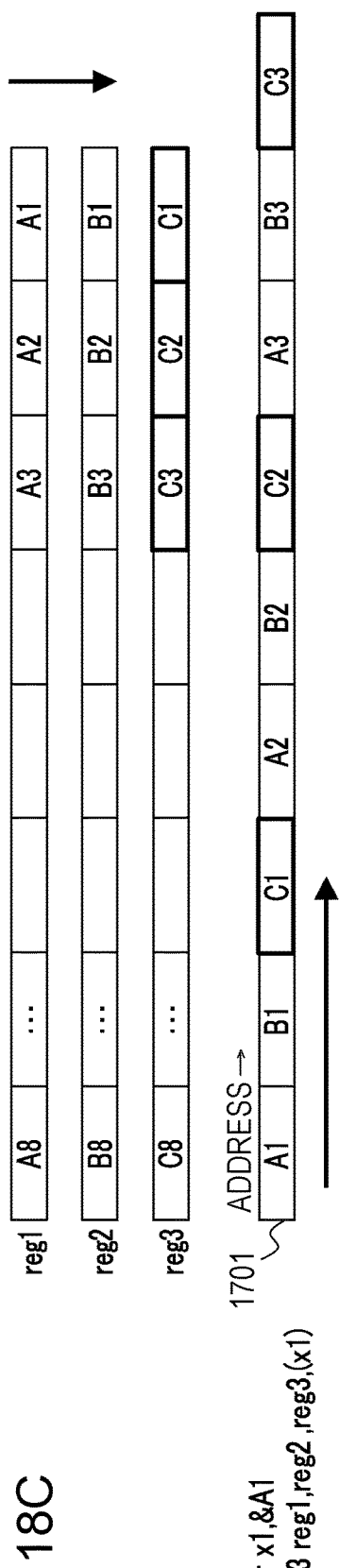

FIGS. 18A to 18C illustrate an example of SIMD extension employing AoS-dedicated instructions. reg1 to reg3 are SIMD registers and capable of storing eight pieces of 64-bit data.

FIG. 18A illustrates an example of a dedicated load instruction. The processor executes a dedicated load instruction ld3 reg1,reg2,reg3,addr to read pieces of data A1 to A8 having an AoS layout from the memory 1701 and sequentially write the pieces of data A1 to A8 to reg1 to reg3 vertically. When a dedicated load instruction is used as in this case, data having an AoS layout is loaded to reg1 to reg3 from the memory 1701 with only one instruction.

FIG. 18B illustrates an example of a SIMD instruction employing reg1 to reg3. The processor executes a SIMD instruction ADD reg3,reg1,reg2 to add Ai (i=1 to 8) stored in reg1 and Bi stored in reg2 in parallel with each other and write results Ci of the addition to reg3.

FIG. 18C illustrates an example of a dedicated store instruction. First, the processor executes an instruction ldr x1,&A1 to calculate storage initial addresses of Ai, Bi, and Ci (i=1 to 8) in the memory 1701 and write the storage initial addresses to register x1, which is not illustrated.

Next, the processor executes a dedicated store instruction st3 reg1,reg2,reg3,(x1) to sequentially read Ai, Bi, and Ci from reg1 to reg3 and write Ai, Bi, and Ci to the memory 1701 in an AoS layout. Ai in reg1 and Bi in reg2 are already stored in the memory 1701, but since the dedicated store instruction is an instruction to read data from reg1 to reg3, Ai and Bi are written to the memory 1701 along with Ci in reg3. When a dedicated store instruction is used as in this case, data having an AoS layout is stored in the memory 1701 from reg1 to reg3 with only one instruction.

In the SIMD extension employing AoS-dedicated instructions illustrated in FIGS. 18A to 18C, the number of instructions used for a SIMD operation is smaller than in the SIMD extension employing existing instructions illustrated in FIGS. 17A to 17E, and SIMD operations are performed more efficiently.

Next, a procedure of code conversion performed by the code conversion apparatus 401 illustrated in FIG. 6 will be described with reference to FIGS. 19 to 24.

Figure 19:
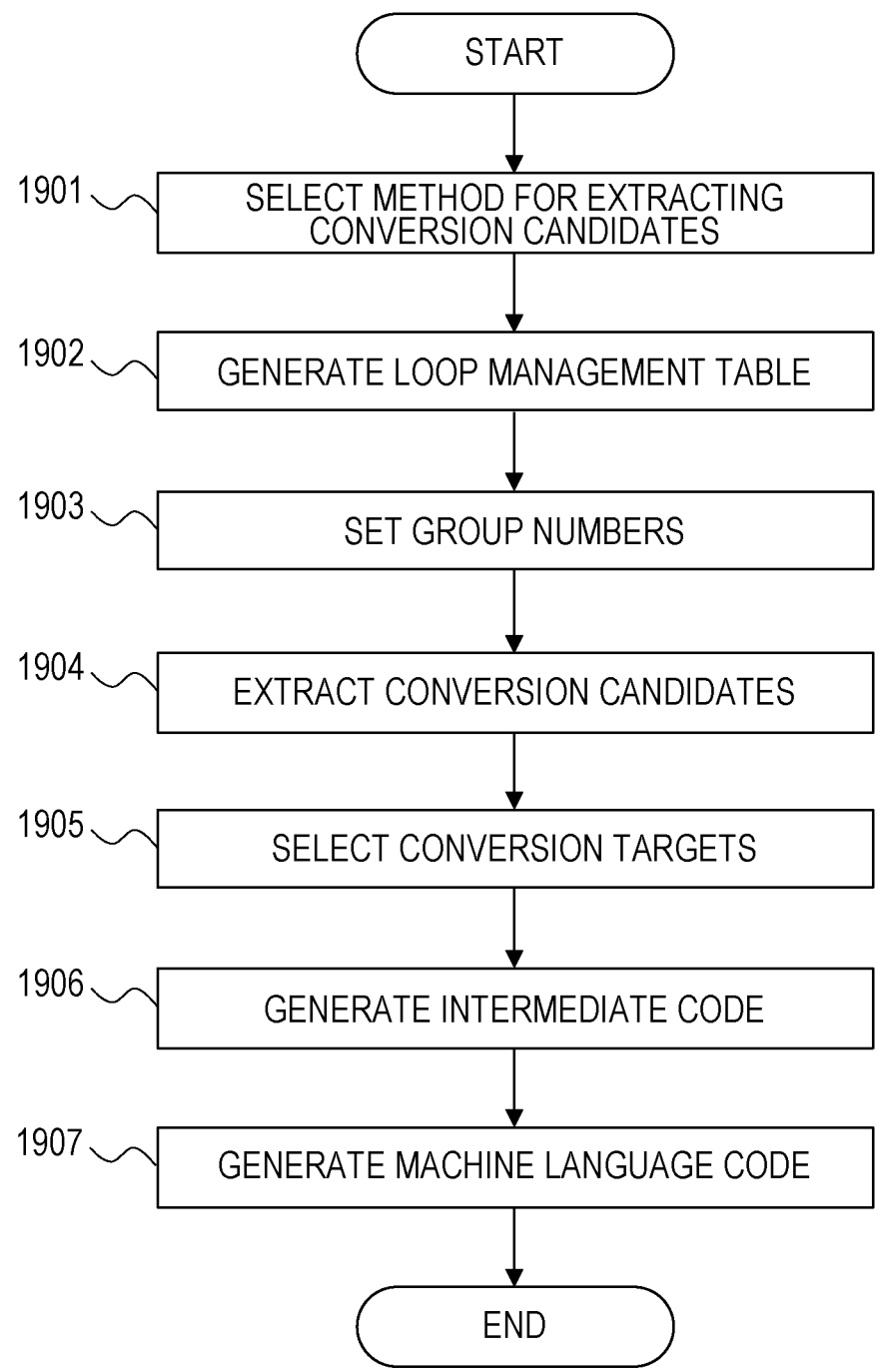
FIG. 19 is a flowchart illustrating a specific example of the code conversion.

FIG. 19 is a flowchart illustrating a specific example of the code conversion. First, the user selects one of the extraction methods M1 to M3 as a method for extracting conversion candidates and inputs an optimization instruction (step 1901).

If the user selects the extraction method M1, the code conversion apparatus 401 extracts conversion candidates in accordance with a selected compiler option. If the user selects the extraction method M2, the code conversion apparatus 401 extracts conversion candidates in accordance with a control statement described in the source code 621. If the user selects the extraction method M3, the code conversion apparatus 401 extracts conversion candidates using selected profile information.

Next, the analysis unit 611 analyzes the source code 621 and generates the loop management table 623 based on a result of the analysis (step 1902).

Next, the conversion unit 412 sets group numbers in the loop management table 623 (step 1903), refers to the loop management table 623, and extracts conversion candidate arrays (step 1904). The conversion unit 412 then selects conversion target arrays from among the conversion candidate arrays (step 1905) and converts the conversion target arrays to generate the intermediate code 625 (step 1906).

Next, the generation unit 413 performs SIMD extension on the intermediate code 625 to generate the machine language code 626 (step 1907).

Figure 20:
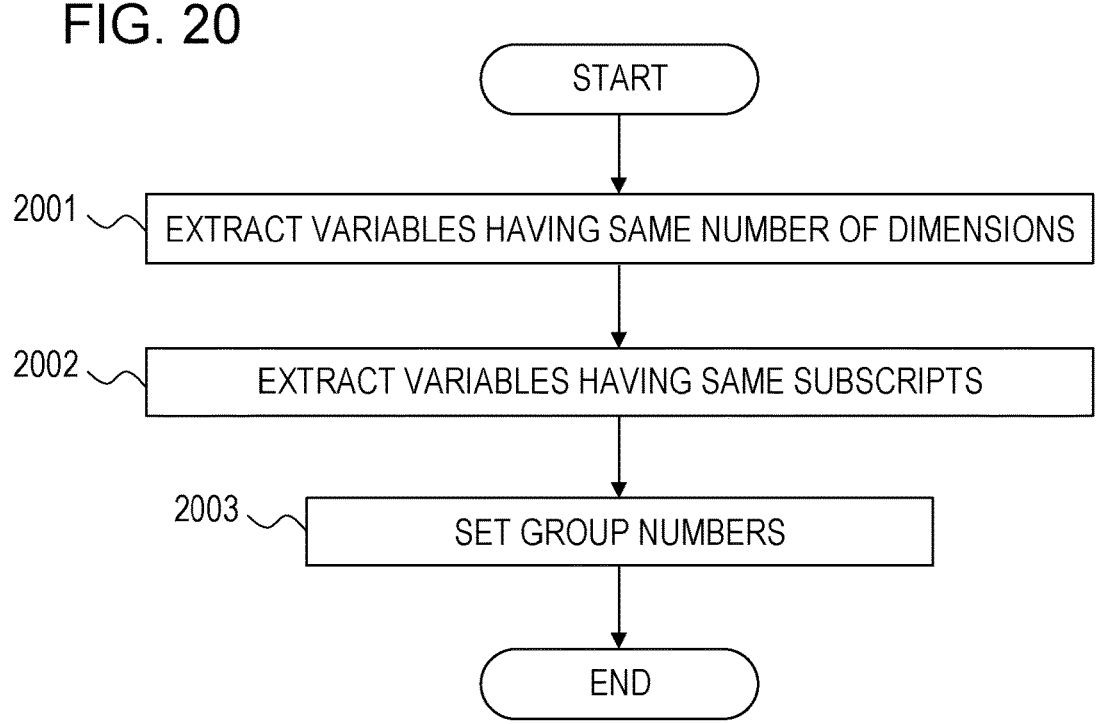
FIG. 20 is a flowchart illustrating setting of group numbers.

FIG. 20 is a flowchart illustrating an example of the setting of group numbers performed in step 1903 illustrated in FIG. 19. First, the conversion unit 412 extracts variables having the same number of dimensions from the loop management table 623 (step 2001). In the loop management table 623 illustrated in FIG. 13B, for example, the following variables are extracted as variables having the same number of dimensions.

One-Dimensional Variables:
A(i), A(i+2), B(i), α(W(i)), and β(W(i))
Two-Dimensional Variables:
AA(i, j), AA(i+1, j), AA(x, z), BB(i, j), BB(i+2, j), BB(z, c), CC(x, y), and DD(x, y)

Next, the conversion unit 412 extracts variables having the same subscripts from the variables having the same number of dimensions and generates groups of the extracted variables (step 2002). In this case, the following four groups are generated.
{A(i), B(i)}
{AA(i, j), BB(i, j)}
{CC(x, y), DD(x, y)}
{α(w(i)), β(w(i))}

Next, the conversion unit 412 sets group numbers for the groups (step 2003). In this case, the following group numbers are set.
Group number "1": {A(i), B(i)}
Group number "2": {AA(i, j), BB(i, j)}
Group number "3": {CC(x, y), DD(x, y)}
Group number "4": {α(W(i)), β(WW)}

Figure 21:
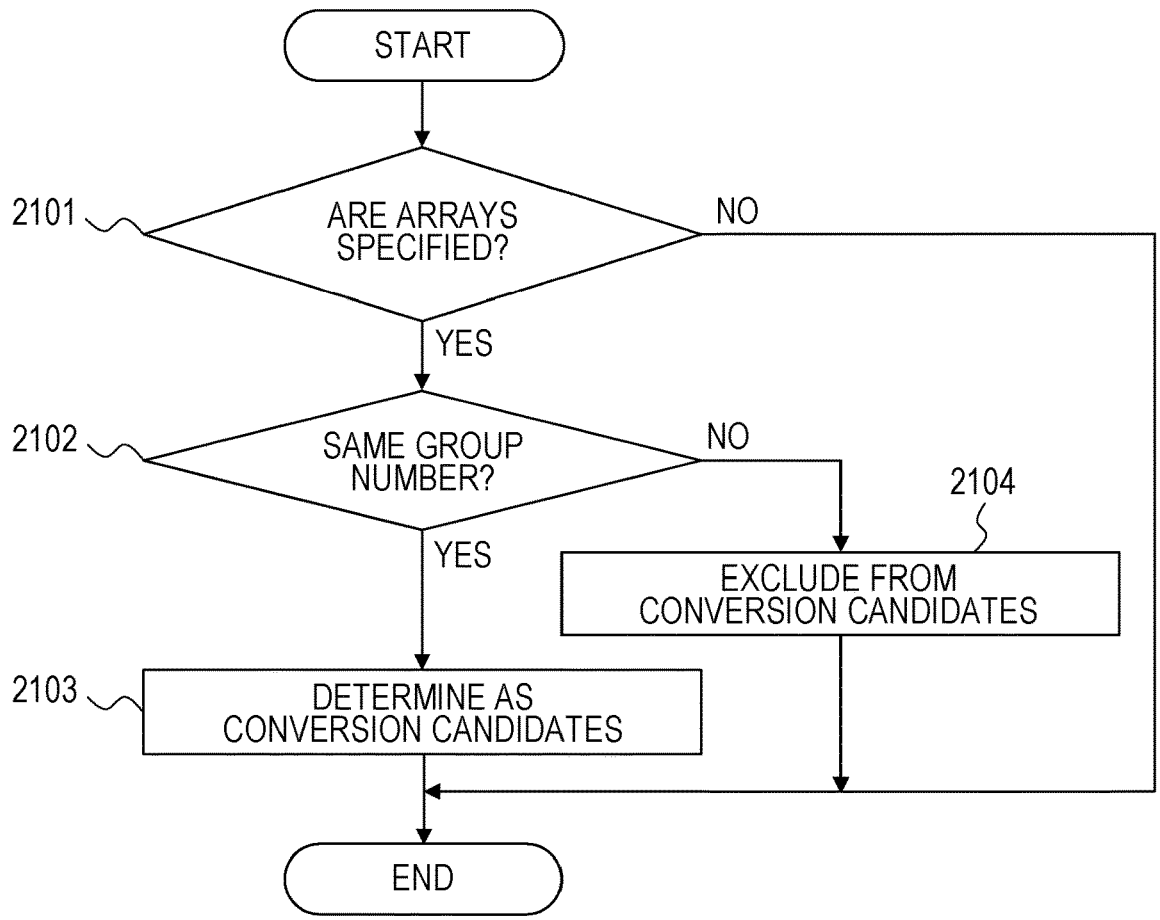
FIG. 21 is a flowchart illustrating extraction of conversion candidates.

FIG. 21 is a flowchart illustrating an example of the extraction of conversion candidates performed in step 1904 illustrated in FIG. 19. First, the conversion unit 412 checks whether a compiler option or a control statement explicitly specifies a plurality of arrays (step 2101).

If a plurality of arrays are explicitly specified (YES in step 2101), the conversion unit 412 checks whether the specified arrays have the same group number in the loop management table 623 (step 2102). If so (YES in step 2102), the conversion unit 412 determines the arrays as conversion candidates (step 2103). If not (NO in step 2102), on other hand, the conversion unit 412 excludes the arrays from conversion candidates (step 2104).

If a plurality of arrays are not explicitly specified (NO in step 2101), the conversion unit 412 extracts conversion candidates from the generated groups. If the compiler option -KAos has been selected, for example, all arrays classified into one of the groups are extracted as conversion candidates. If profile information has been selected, arrays that are frequently accessed simultaneously are extracted as conversion candidates.

Figure 22:
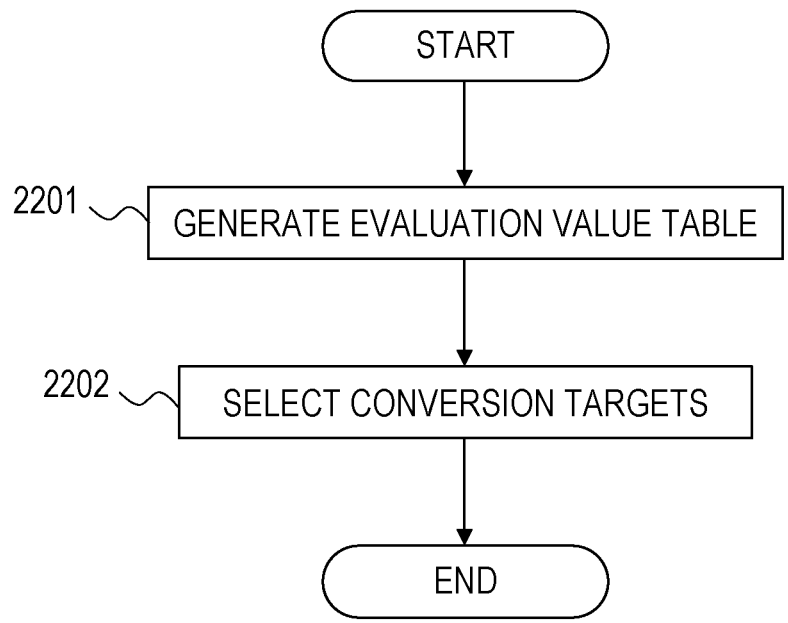
FIG. 22 is a flowchart illustrating selection of a conversion target.

FIG. 22 is a flowchart illustrating an example of the selection of a conversion target performed in step 1905 illustrated in FIG. 19. First, the conversion unit 412 calculates, using the evaluation function 622, an evaluation value of each conversion candidate array and generates the evaluation value table 624 including the calculated evaluation values (step 2201). The conversion unit 412 then refers to the evaluation value table 624 and selects arrays belonging to a group whose total is larger than the threshold as conversion targets (step 2202).

Figure 23:
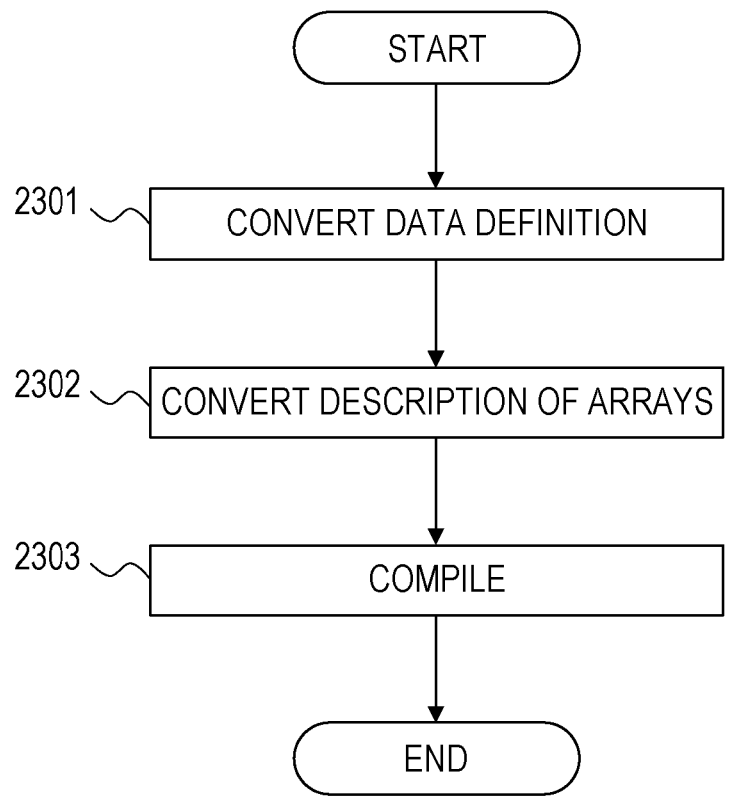
FIG. 23 is a flowchart illustrating generation of an intermediate code.

FIG. 23 is a flowchart illustrating an example of the generation of the intermediate code 625 performed in step 1906 illustrated in FIG. 19. First, the conversion unit 412 converts a data definition of a conversion target array included in the source code 621 into a data definition of an AoS layout for each group and defines an AoS (step 2301). As subscripts and the number of elements of the AoS, subscripts and the number of elements of each array before the conversion are used.

Next, the conversion unit 412 converts a description of the conversion target arrays included in the source code 621 into a description for which an AoS is used (step 2302). The conversion unit 412 then compiles a code including a data definition of an AoS layout and the description of the AoS to generate the intermediate code 625 (step 2303).

Figure 24:
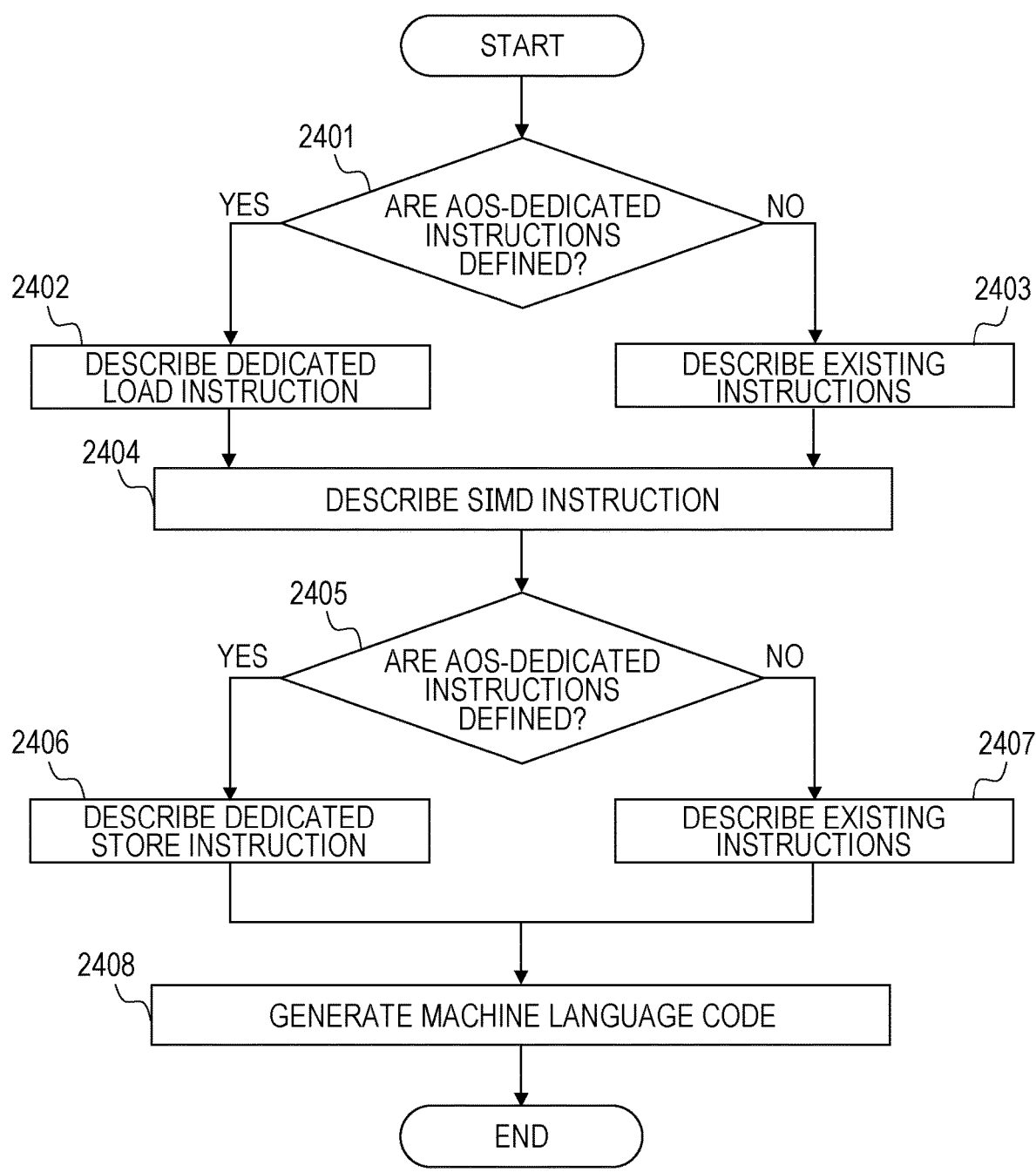
FIG. 24 is a flowchart illustrating generation of a machine language code.

FIG. 24 is a flowchart illustrating an example of the generation of the machine language code 626 performed in step 1907 illustrated in FIG. 19. First, the generation unit 413 checks whether AOS-dedicated instructions, which include a dedicated load instruction and a dedicated store instruction, are defined (step 2401).

If AoS-dedicated instructions are defined (YES in step 2401), the generation unit 413 describes the dedicated load instruction in the machine language code 626 (step 2402). If AoS-dedicated instructions are not defined (NO in step 2401), on the other hand, the generation unit 413 describes, in the machine language code 626, an operation for reading data having an AoS layout from the memory and writing the data to SIMD registers by combining existing instructions together (step 2403).

Next, the generation unit 413 describes a SIMD instruction employing SIMD registers in the machine language code 626 (step 2404) and checks whether AoS-dedicated instructions are defined (step 2405).

If the AoS-dedicated instructions are defined (YES in step 2405), the generation unit 413 describes the dedicated store instruction in the machine language code 626 (step 2406). If AoS-dedicated instructions are not defined (NO in step 2405), on the other hand, the generation unit 413 describes, in the machine language code 626, an operation for reading data having an AoS layout from a SIMD register and writing the data to the memory by combining existing instructions together (step 2407).

The generation unit 413 then generates the machine language code 626 including the dedicated load instruction or the existing instructions, the SIMD instruction, and the dedicated store instruction or the existing instructions (step 2408).

The configuration of the code conversion apparatus 401 illustrated in FIGS. 4 and 6 is an example, and some components may be omitted or replaced in accordance with usage of the code conversion apparatus 401 and other conditions. If an external apparatus generates the loop management table 623 for the code conversion apparatus 401 illustrated in FIG. 6, for example, the analysis unit 611 may be omitted.

The flowcharts of FIGS. 5 and 19 to 24 are examples, and some steps may be omitted or changed in accordance with the configuration of the code conversion apparatus 401 and other conditions. If an external apparatus generates the loop management table 623, for example, step 1902 illustrated in FIG. 19 may be omitted. If a compiler option or a control sentence does not explicitly specify a plurality of arrays, step 1904 illustrated in FIG. 19 may be omitted.

The data definition of an SoA layout and the SIMD extension illustrated in FIGS. 1A to 3 are examples, and the data definition of an SoA layout and the SIMD extension change in accordance with a language of the source code 621 and types of arrays and operations included in the source code 621.

The data definition of an AoS layout and the SIMD extension illustrated in FIGS. 7A to 7C, 10 to 12, and 15 to 18C are examples, and the data definition of an AoS layout and the SIMD extension change in accordance with the language of the source code 621 and the types of arrays and operations included in the source code 621. The operations included in the source code 621 may be a combination of a plurality of operations such as addition, subtraction, multiplication, and division.

The data definition of a hybrid AoS layout illustrated in FIG. 8 is an example, and the data definition of a hybrid AoS layout changes in accordance with the language of the source code 621 and the types of arrays and operations included in the source code 621. The processing performance illustrated in FIG. 9 is an example, and processing performance changes in accordance with the source code 621.

The loop management table 623 illustrated in FIG. 13B and the evaluation value table 624 illustrated in FIG. 14 are examples, and the loop management table 623 and the evaluation value table 624 change in accordance with the types of arrays and the number of arrays included in the source code 621. Some items of the loop management table 623 and the evaluation value table 624 may be omitted or changed in accordance with the configuration of the code conversion apparatus 401 and other conditions.

The evaluation function E(Q) in expression (1) is an example, and evaluation values of arrays may be calculated using another evaluation function E(Q), instead.

Figure 25:
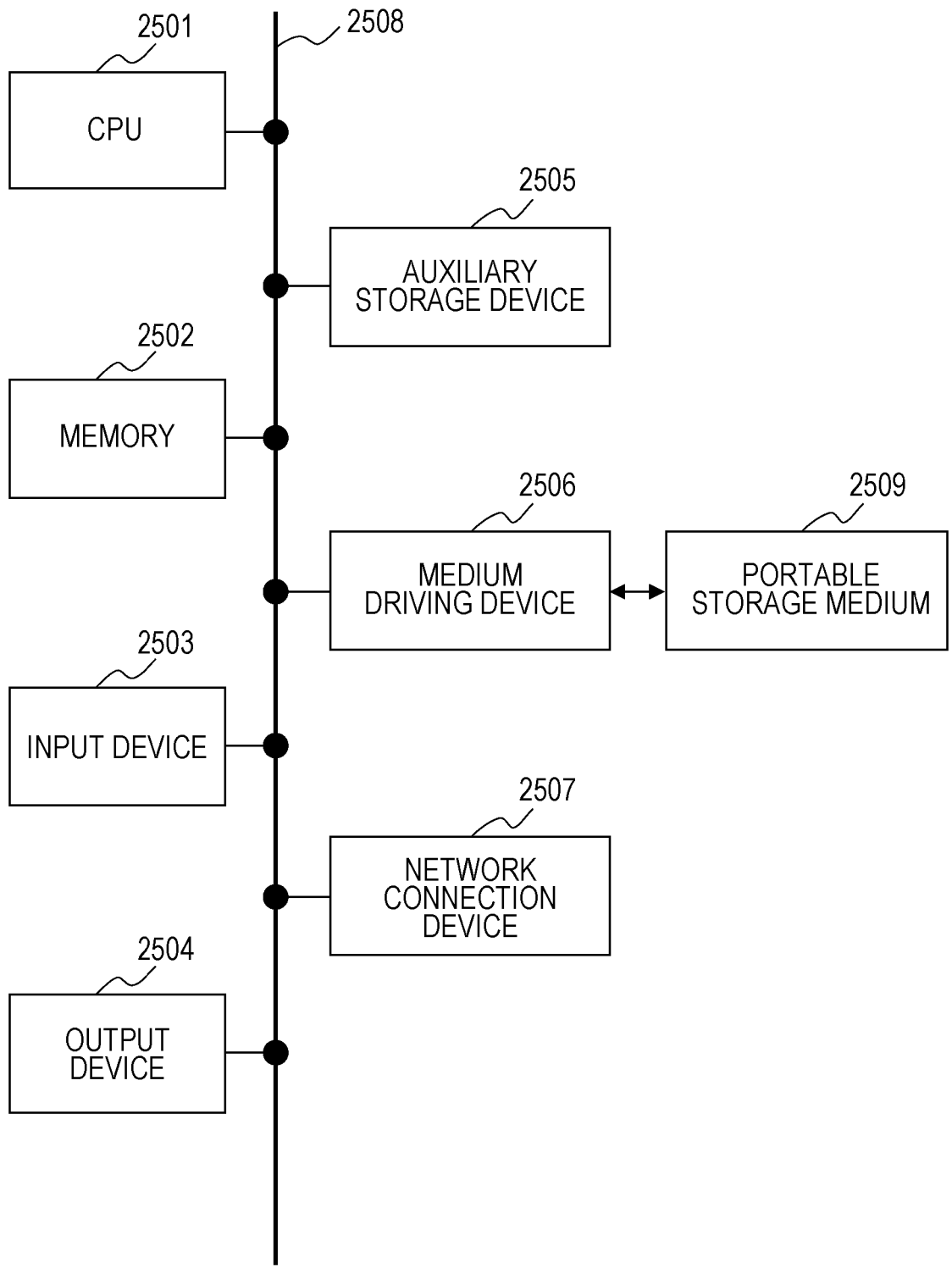
FIG. 25 is a diagram illustrating the configuration of an information processing apparatus.

FIG. 25 illustrates an example of the hardware configuration of an information processing apparatus (computer) used as the code conversion apparatus 401 illustrated in FIGS. 4 and 6. The information processing apparatus illustrated in FIG. 25 includes a central processing unit (CPU) 2501, a memory 2502, an input device 2503, an output device 2504, an auxiliary storage device 2505, a medium driving device 2506, and a network connection device 2507. These components are connected to one another by a bus 2508.

The memory 2502 is, for example, a semiconductor memory such as a read-only memory (ROM), a random-access memory (RAM), or a flash memory and stores programs and data used for operations. The memory 2502 may be used as the storage unit 411 illustrated in FIGS. 4 and 6.

The CPU 2501 (processor) operates as the conversion unit 412 and the generation unit 413 illustrated in FIGS. 4 and 6, for example, by executing a program using the memory 2502. The CPU 2501 also operates as the analysis unit 611 illustrated in FIG. 6 by executing a program using the memory 2502.

The input device 2503 is a keyboard, a pointing device, or the like, for example, and used by an operator or the user to input instructions and information. The output device 2504 is a display device, a printer, a speaker, or the like, for example, and used to issue inquiries and instructions to the operator or the user and output results of operations.

The auxiliary storage device 2505 is, for example, a magnetic disk device, an optical disc device, a magneto-optical disk device, a tape device, or the like. The auxiliary storage device 2505 may be a hard disk drive, instead. The information processing apparatus may store programs and data in the auxiliary storage device 2505 and load the programs and the data into the memory 2502 in order to use the programs and the data.

The medium driving device 2506 drives a portable storage medium 2509 to access data stored in the portable storage medium 2509. The portable storage medium 2509 is a memory device, a flexible disk, an optical disc, a magneto-optical disk, or the like. The portable storage medium 2509 may be a compact disc read-only memory (CD-ROM), a digital versatile disc (DVD), a universal serial bus (USB) memory, or the like, instead. The operator or the user may store programs and data in the portable storage medium 2509 and load the programs and the data into the memory 2502 in order to use the programs and the data.

A computer-readable storage medium storing programs and data used in operations is thus a physical (non-transitory) storage medium such as the memory 2502, the auxiliary storage device 2505, or the portable storage medium 2509.

The network connection device 2507 is a communication interface circuit that is connected to a communication network such as a local area network (LAN) or a wide area network (WAN) and that converts data for communication. The information processing apparatus may receive programs and data from external apparatuses through the network connection device 2507 and load the programs and the data into the memory 2502 in order to use the programs and the data.

The information processing apparatus does not have to include all the components illustrated in FIG. 25 and may omit some components in accordance with usage and other conditions. If any interface with the user or the operator is unnecessary, for example, the input device 2503 or the output device 2504 may be omitted. If the portable storage medium 2509 or the communication network is not used, the medium driving device 2506 or the network connection device 2507 may be omitted.

Although an embodiment and advantageous effects thereof have been described in detail, those skilled in the art could perform various types of modification, addition, and omission without deviating from the scope of the embodiment, which is specified in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A code conversion apparatus, comprising:
   a memory configured to store therein a first code including a first data definition of a plurality of arrays, a first operation for the plurality of arrays, and a second data definition of an array indicating a result of the first operation; and
   a processor coupled to the memory and the processor configured to:
   convert the first data definition and the second data definition included in the first code into a data definition of an array of structures;
   convert the first operation included in the first code into a second operation for the array of structures; and
   generate a second code including a predetermined instruction to perform the second operation on different pieces of data of the plurality of arrays in parallel with one another.

2. The code conversion apparatus according to claim 1, wherein
   the predetermined instruction includes an instruction to perform the second operation on data of a plurality of arrays stored in a plurality of registers and write data of an array indicating a result of the second operation into a predetermined register, and
   the second code further includes:
   an instruction to read data of a plurality of arrays of structures successively stored in the memory and write data of the plurality of arrays included in each of the plurality of arrays of structures into the plurality of registers; and
   an instruction to read the data of the array indicating the result of the second operation from the predetermined register and write the read data to the memory at a position of the data of the array indicating the result of the second operation, wherein the data of the array indicating the result of the second operation is included in each of the plurality of arrays of structures stored in the memory.

3. The code conversion apparatus according to claim 1, wherein
   the predetermined instruction includes an instruction to perform the second operation on data of arrays stored in a plurality of registers and write data of an array indicating a result of the second operation into a predetermined register, and
   the second code further includes:
   an instruction to read data of a plurality of arrays of structures successively stored in the memory and successively write the read data into a first register;
   an instruction to specify positions of data of a same array included in data of each of the plurality of arrays of structures, to read data at the specified positions from the first register, and to successively write the read data into one of the plurality of registers; and
   an instruction to read the data of the array indicating the result of the second operation from the predetermined register, specify a position of the data of the array indicating the result of the second operation among data of each of the plurality of arrays of structures stored in the memory, and write the data read from the predetermined register at the specified position into the memory.

4. The code conversion apparatus according to claim 1, wherein
   the processor is further configured to:
   select, in accordance with a compiler option indicating conversion of a data definition, the plurality of arrays and the array indicating the result of the first operation from the arrays defined in the first code.

5. The code conversion apparatus according to claim 1, wherein
   the first code includes a control statement for specifying the plurality of arrays and the array indicating the result of the first operation, and
   the processor is further configured to:
   select, in accordance with the control statement, the plurality of arrays and the array indicating the result of the first operation from the arrays defined in the first code.

6. The code conversion apparatus according to claim 1, wherein
   the processor is further configured to:
   select, using profile information indicating an access frequency of each of the arrays defined in the first code, the plurality of arrays and the array indicating the result of the first operation from the arrays defined in the first code.

7. The code conversion apparatus according to claim 1, wherein
   the processor is further configured to:
   select the plurality of arrays from among arrays within a loop included in the first code based on a number of appearances of each array in the loop or a number of appearances of each array in a group of arrays having a same subscript in the loop.

8. The code conversion apparatus according to claim 1, wherein
   the first data definition included in the first code is a data definition of a structure of arrays.

9. A method for improving performance in computer operations, the method comprising:
   converting, by a computer, a first data definition, included in a first code, of a plurality of data arrays into a second data definition of an array of structures (AoS), wherein the plurality of data arrays include data pieces stored in a memory;
   converting a first operation, also included in the first code, on the plurality of data arrays into a second operation for the AoS;
   generating a second code to perform the second operation on the plurality of data arrays based on the second data definition of the AoS; and
   enabling the second code to execute a process including:
   successively reading the data pieces from the memory;
   loading the read data pieces into a plurality of registers in a vertical direction, with each successive data piece loading into a different one of the plurality of registers;
   performing the second operation involving data pieces loaded in at least two of plurality of registers in parallel with one another;
   writing resulting data indicating a result of the second operation in another one of plurality of registers that is different from the at least two registers; and
   storing the resulting data from the another register back in the memory at a predetermined location different from locations used to store the data pieces involved in the second operation.

10. A non-transitory computer-readable recording medium having stored therein a program that causes a computer to execute a process, the process comprising:

converting a first data definition of a plurality of arrays and a second data definition of an array indicating a result of a first operation for the plurality of arrays into a data definition of an array of structures, wherein the first data definition, the second data definition, and the first operation are included in a first code;

converting the first operation included in the first code into a second operation for the array of structures; and generating a second code including a predetermined instruction to perform the second operation on different pieces of data of the plurality of arrays in parallel with one another.

11. The non-transitory computer-readable recording medium according to claim 10, wherein the predetermined instruction is an instruction to perform the second operation on data of arrays stored in a plurality of registers and write data of an array indicating a result of the second operation into a predetermined register, and the second code further includes:

an instruction to read data of a plurality of arrays of structures successively stored in the memory and write data of the plurality of arrays included in each of the plurality of arrays of structures into the plurality of registers; and an instruction to read the data of the array indicating the result of the second operation from the predetermined register and write the read data to the memory at a position of the data of the array indicating the result of the second operation included in each of the plurality of arrays of structures stored in the memory.

12. The non-transitory computer-readable recording medium according to claim 10, wherein the predetermined instruction includes an instruction to perform the second operation on data of a arrays stored in a plurality of registers and write data of an array indicating a result of the second operation into a predetermined register, and the second code further includes:

an instruction to read data of a plurality of arrays of structures successively stored in the memory and successively write the read data into a first register;

an instruction to specify positions of data of a same array included in data of each of the plurality of arrays of structures, to read data at the specified positions from the first register, and to successively write the read data into one of the plurality of registers; and an instruction to read the data of the array indicating the result of the second operation from the predetermined register, specify a position of the data of the array indicating the result of the second operation among data of each of the plurality of arrays of structures stored in the memory, and write the data read from the predetermined register at the specified position into the memory.

* * * * *